(12) United States Patent
Watanabe et al.

(10) Patent No.: US 10,606,201 B2
(45) Date of Patent: Mar. 31, 2020

(54) IMAGE FORMING APPARATUS

(71) Applicant: SHARP KABUSHIKI KAISHA, Sakai, Osaka (JP)

(72) Inventors: Yuki Watanabe, Sakai (JP); Masaya Asakawa, Sakai (JP); Takashi Sawano, Sakai (JP); Kumiko Ogino, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/221,236

(22) Filed: Dec. 14, 2018

(65) Prior Publication Data

US 2019/0212684 A1 Jul. 11, 2019

(30) Foreign Application Priority Data

Jan. 5, 2018 (JP) ................................. 2018-000811

(51) Int. Cl.
*G03G 15/00* (2006.01)
*G06F 3/12* (2006.01)

(52) U.S. Cl.
CPC ....... *G03G 15/5016* (2013.01); *G03G 15/607* (2013.01); *G06F 3/1204* (2013.01); *G06F 3/1205* (2013.01); *G06F 3/1252* (2013.01)

(58) Field of Classification Search
USPC .......................................................... 399/81
See application file for complete search history.

(56) References Cited

U.S. PATENT DOCUMENTS

2011/0188877 A1* 8/2011 Suese ..................... G03G 15/00
399/81

FOREIGN PATENT DOCUMENTS

JP 2015-087470 A 5/2015

* cited by examiner

*Primary Examiner* — Quana Grainger
(74) *Attorney, Agent, or Firm* — ScienBiziP, P.C.

(57) ABSTRACT

An image forming apparatus includes: a display unit; a storage unit in which sheet setting information for specifying a sheet to be printed is stored in advance; a sheet accommodating unit in which the sheet to be printed is accommodated; a sheet detection unit that detects whether or not there is a sheet in the sheet accommodating unit; and a confirmation display control unit that causes the display unit to display a sheet setting confirmation screen that includes the sheet setting information stored in the storage unit, in which in a case where the sheet detection unit detects that a sheet is supplied to the sheet accommodating unit, the confirmation display control unit causes the display unit to display the sheet setting confirmation screen.

11 Claims, 15 Drawing Sheets

FIG. 3A

| SHEET INFORMATION | | | |
|---|---|---|---|
| SHEET TYPE | PLAIN PAPER | PRINTED PAPER | RECYCLED PAPER |
| | LETTER HEAD PAPER | PUNCHED PAPER | COLORED PAPER |
| | THICK PAPER 1 | THICK PAPER 2 | THICK PAPER 3 |
| | EMBOSSED PAPER | THIN PAPER | LABEL PAPER |
| | OHP FILM | INDEX PAPER | USER TYPE 1 |
| SHEET SIZE | A3 | A4 | A5 | A6 |
| | B3 | B4 | B5 | B6 |
| | LETTER | POSTCARD | USER 1 | USER 2 |

FIG. 3B

| SHIPMENT SETTING INFORMATION | SHEET TYPE | SHEET SIZE |
|---|---|---|
| | PLAIN PAPER | A4 |

FIG. 3C

| USER SETTING INFORMATION | SHEET TYPE | SHEET SIZE |
|---|---|---|
| | LABEL PAPER | B5 |

FIG. 3D

| CURRENT SETTING INFORMATION | SHEET TYPE | SHEET SIZE |
|---|---|---|
| | RECYCLED PAPER | A4 |

FIG. 3E

| SETTING CONFIRMATION AVAILABILITY INFORMATION | CONFIRM (1) | (DISPLAY SHEET SETTING CONFIRMATION SCREEN) |
|---|---|---|
| | NOT CONFIRM (0) | (NOT DISPLAY SHEET SETTING CONFIRMATION SCREEN) |

FIG. 6

CURRENT MANUAL TRAY SETTINGS BELOW.

TYPE: PLAIN PAPER

SIZE: A4

WHEN DIFFERENT FROM SHEET TO BE PRINTED, PRESS [CHANGE].

CHANGE

OK

IMAGE FORMING APPARATUS

BACKGROUND

1. Field

The present disclosure relates to an image forming apparatus, and particularly relates to an image forming apparatus having a function of detecting whether or not a sheet to be printed is fed.

2. Description of the Related Art

Image forming apparatuses have been used in the related art and sheets having various sizes and quality (types) are used for sheets on which information such as an image is printed. For example, sheets in standard sizes such as A4 and B5, and paper products for special use such as a postcard and an envelope are used, and sheet having different quality such as thick paper, colored paper, and label paper in addition to plain paper, are used. While plain paper in a standard size or the like is accommodated in a feeding cassette and fed, a sheet, such as a postcard, an envelope, or thick paper, which has a non-standard size and special quality is placed on a manual tray and fed in many cases.

When a user places a sheet on the manual tray, in order to recognize a type of the sheet that is placed, for example, the user is requested to display a setting screen for setting a sheet size and a sheet type and set and input a size and a type of the sheet placed on the manual tray.

Japanese Unexamined Patent Application Publication No. 2015-87470 proposes an image forming apparatus in which when a sheet is set on a manual tray, a size of the sheet and a type of the sheet are estimated by a sheet width sensor, a sheet length sensor, a sheet type detection sensor, and a sheet thickness detection sensor, and an estimation result is compared to sheet size information and sheet type information that are stored in a storage unit. When the estimation result is different from such information, a manual sheet setting screen is popped up so that the user is guided to input the sheet size and the sheet type, and when the estimation result is the same as such information, setting is finished without popping up the manual sheet setting screen, to thereby suppress forgetting to input sheet size information or sheet type information and avoid inconvenience for the user when the user sets a sheet having the same sheet size and sheet type as previous ones.

In an apparatus in the related art, however, when a sheet is placed on a manual tray, a setting screen for setting a sheet size and a sheet type is displayed, and a user is requested to perform an input to select a desired setting item from among many setting items displayed in the setting screen without fail.

Additionally, according to Japanese Unexamined Patent Application Publication No. 2015-87470, a change in the sheet size or the sheet type is detected to estimate the sheet that is set, and it is desired that the sheet width sensor and the sheet length sensor are provided to estimate the sheet size, and it is also desired that the sheet type detection sensor and the sheet thickness detection sensor are provided to estimate the sheet type. As a result, a structure of the apparatus is complicated and it is desired to mount the aforementioned sensors and a control program for estimating the sheet size and the like, so that the apparatus becomes expensive.

Then, the disclosure is made in view of circumstances as described above. In the disclosure, in a case where a sheet is supplied, a user is able to easily confirm sheet setting information such as a sheet size that is currently set, and when it is desired to change the sheet setting information after the confirmation of the user, setting and input by the user are allowed, so that an operation burden on the user is reduced and printing processing or the like is inhibited from being performed with erroneous sheet setting remained.

SUMMARY

The disclosure provides an image forming apparatus including: a display unit; a storage unit in which sheet setting information for specifying a sheet to be printed is stored in advance; a sheet accommodating unit in which the sheet to be printed is accommodated; a sheet detection unit that detects whether or not there is a sheet in the sheet accommodating unit; and a confirmation display control unit that causes the display unit to d splay a sheet setting confirmation screen that includes the sheet setting information stored in the storage unit, in which in a case where the sheet detection unit detects that a sheet is supplied to the sheet accommodating unit, the confirmation display control unit causes the display unit to display the sheet setting confirmation screen.

The disclosure provides a sheet setting confirmation method of an image forming apparatus that includes a display unit, a storage unit in which sheet setting information for specifying a sheet to be printed is stored in advance, a sheet accommodating unit in which the sheet to be printed is accommodated, a sheet detection unit that detects whether or not there is a sheet in the sheet accommodating unit, and a confirmation display control unit that causes the display unit to display a sheet setting confirmation screen that includes the sheet setting information stored in the storage unit, and the method includes after detecting that a sheet is supplied to the sheet accommodating unit by the sheet detection unit, causing, by the confirmation display control unit, the display unit to display the sheet setting confirmation screen that includes the sheet setting information stored in the storage unit.

BRIEF DESCRIPTION OF THE DRAWINGS

FIGS. 3A to 3E are explanatory views of an exemplary embodiment of information stored in the image forming apparatus of the disclosure;

FIG. 6 is an explanatory view of an exemplary embodiment of the sheet setting confirmation screen in the image forming apparatus of the disclosure;

DESCRIPTION OF THE EMBODIMENTS

Embodiments of the disclosure will be described below with reference to drawings. Note that, the disclosure is not limited by the description of exemplary embodiments below.
<Configuration of Image Forming Apparatus>

Figure 1A:
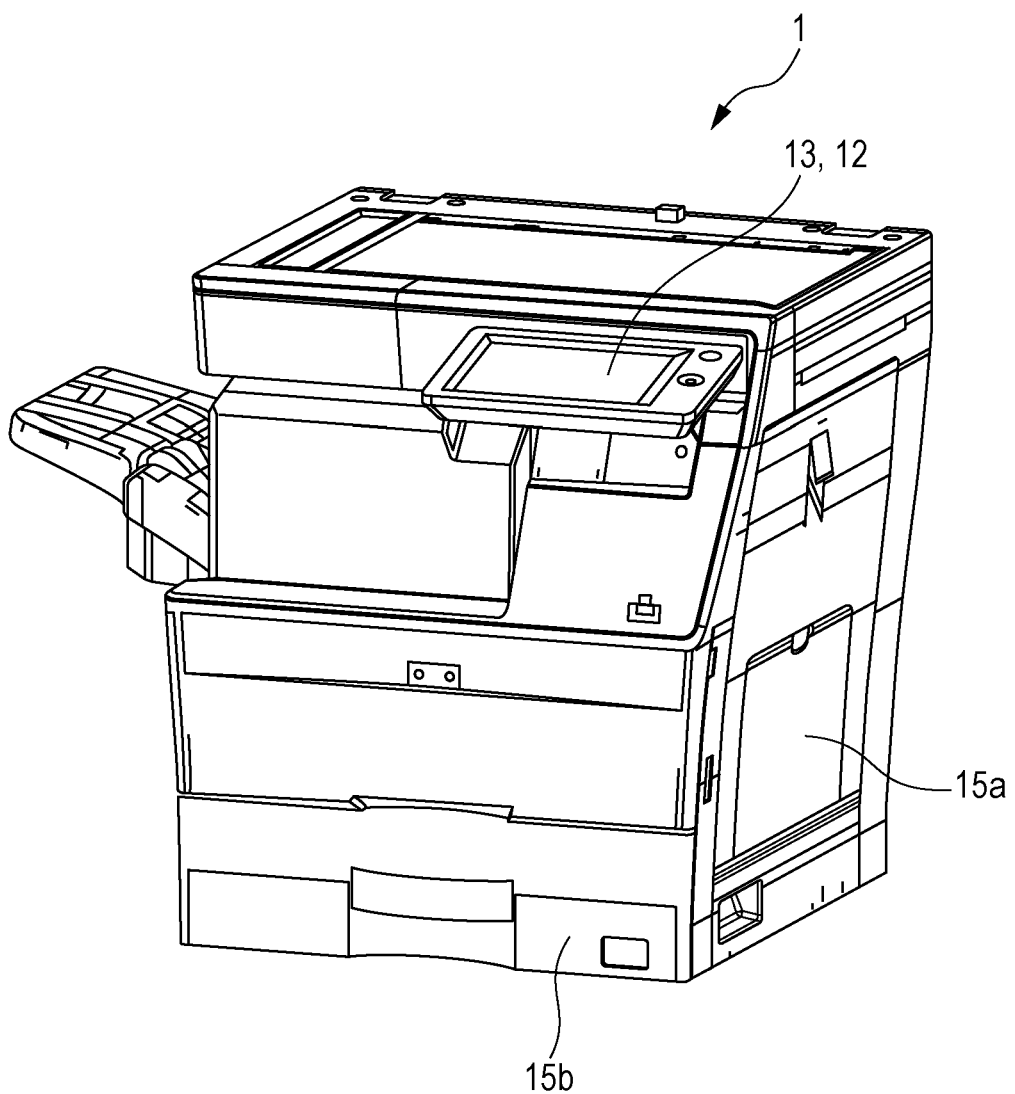
FIGS. 1A and 1B are schematic perspective views of an exemplary embodiment of an image forming apparatus of the disclosure.

FIGS. 1A and 1E are schematic perspective views of an exemplary embodiment of an image forming apparatus of the disclosure.

An image forming apparatus (hereinafter, also called an MFP: Multifunction Peripheral) 1 is an apparatus that processes image data and an example thereof includes an electronic device having a copying function, a printing function, a document reading function (scanning function), a FAX function, a communication function, and the like.

Figure 1B:
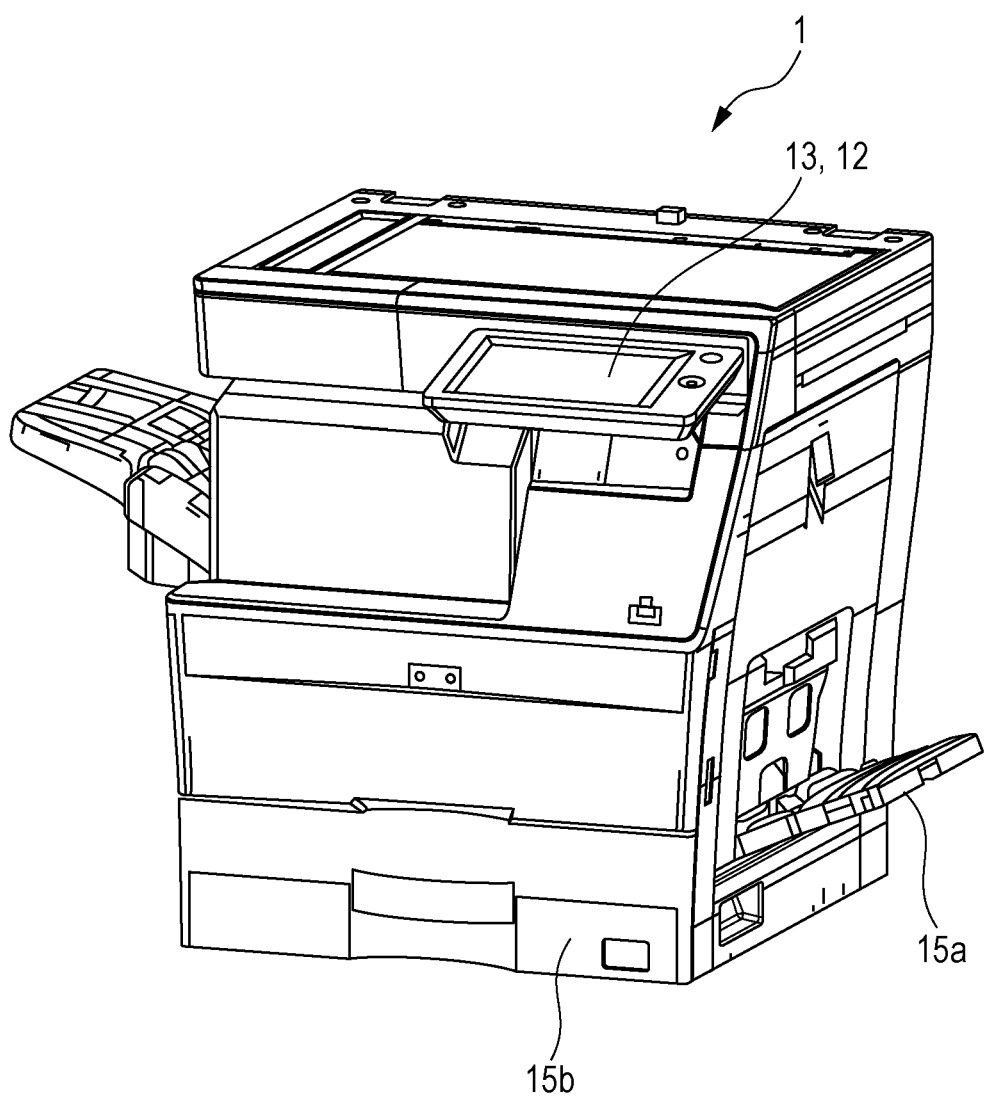

In FIGS. 1A and 1B, the image forming apparatus 1 includes, particularly as members that accommodate a sheet to be printed, a manual tray 15a and a feeding cassette 15b, and includes a display unit 13 on which sheet setting information or the like that is currently set is confirmed and an operation unit 12 by which the sheet setting information is set and input. A touch panel may be used as the operation unit 12 and the operation unit 12 may be arranged in an overlaid state on the display unit 13. The image forming apparatus 1 also includes components for executing the copying function, the printing function, and the like of the image forming apparatus. For example, the image forming apparatus 1 includes, in addition to the manual tray 15a and the feeding cassette 15b, a discharge tray and a discharge mechanism that discharges a conveyed sheet to the discharge tray. Moreover, the image forming apparatus 1 includes components similar to those of an image forming apparatus in the related art, such as a document feeder (not illustrate), a scanner, a transfer device, and a fixing device.

The manual tray 15a is a placement table of a sheet to be printed and a desired sheet to be printed by a user is able to be placed on the manual tray 15a. For example, a sheet in a standard size, a sheet in a non-standard size, such as a postcard or label paper, or a sheet with special quality is placed on the manual tray 15a.

FIG. 1A illustrates an accommodated state (unused state) in which the manual tray 15a is closed and FIG. 1B illustrates a used state in which the manual tray 15a is opened. In a case where a desired sheet to be printed is fed from the manual tray 15a, the user opens the manual tray 15a as in FIG. 1B and places one or more desired sheets on the manual tray 15a. In a case where printing starts by using the sheet placed on the manual tray 15a, the sheet is taken into inside of the apparatus through a sheet inlet of the manual tray 15a one by one by a pick-up roller (not illustrated).

In a vicinity of the sheet inlet of the manual tray 15a, a switch or an optical sensor that serves as a sheet detection unit described below is attached. The switch is arranged so as to partially protrude from an upper surface of the manual tray 15a and has a structure in which the switch is able to be pressed down by the sheet placed on the manual tray 15a. In a case where the sheet is placed on the manual tray 15a, for example, when the switch is pressed down by the sheet, it is detected that the sheet is placed on the manual tray 15a, and when the switch is not pressed down, it is detected that no sheet is placed on the manual tray 15a.

On the other hand, a sheet in a standard size such as A4 or B5 is mostly accommodated in the feeding cassette 15b. The sheet accommodated in the feeding cassette 15b is taken into inside of the apparatus through a sheet inlet of the feeding cassette 19b one by one by a pick-up roller.

In particular, in the disclosure, sheet setting information is stored in advance in a storage unit of the image forming apparatus, and when the sheet is placed on the manual tray or when the sheet is fed to the feeding cassette, a sheet setting confirmation screen is automatically displayed on the display unit without performing a special input operation by the user. As described below, the sheet setting information includes information (called sheet size information) for specifying a size of a sheet and information (called sheet type information) for specifying a type (sheet type) of a sheet usable in the image forming apparatus. In the sheet setting confirmation screen, the sheet setting information that is stored in advance in the storage unit, for example, setting information (current setting information) that includes a sheet size and a sheet type of a sheet used in previous printing is displayed.

By seeing the sheet setting confirmation screen, the user is able to confirm whether or not the sheet to be printed from now on has the same information as the sheet setting information that is currently stored, and when the sheet to be printed has the same information as the sheet setting information that is stored, the user is able to perform printing start processing immediately after that, and when the sheet to be printed does not have the same information as the sheet setting information that is stored, the user may perform an input operation of changing the sheet setting information.

Figure 2:
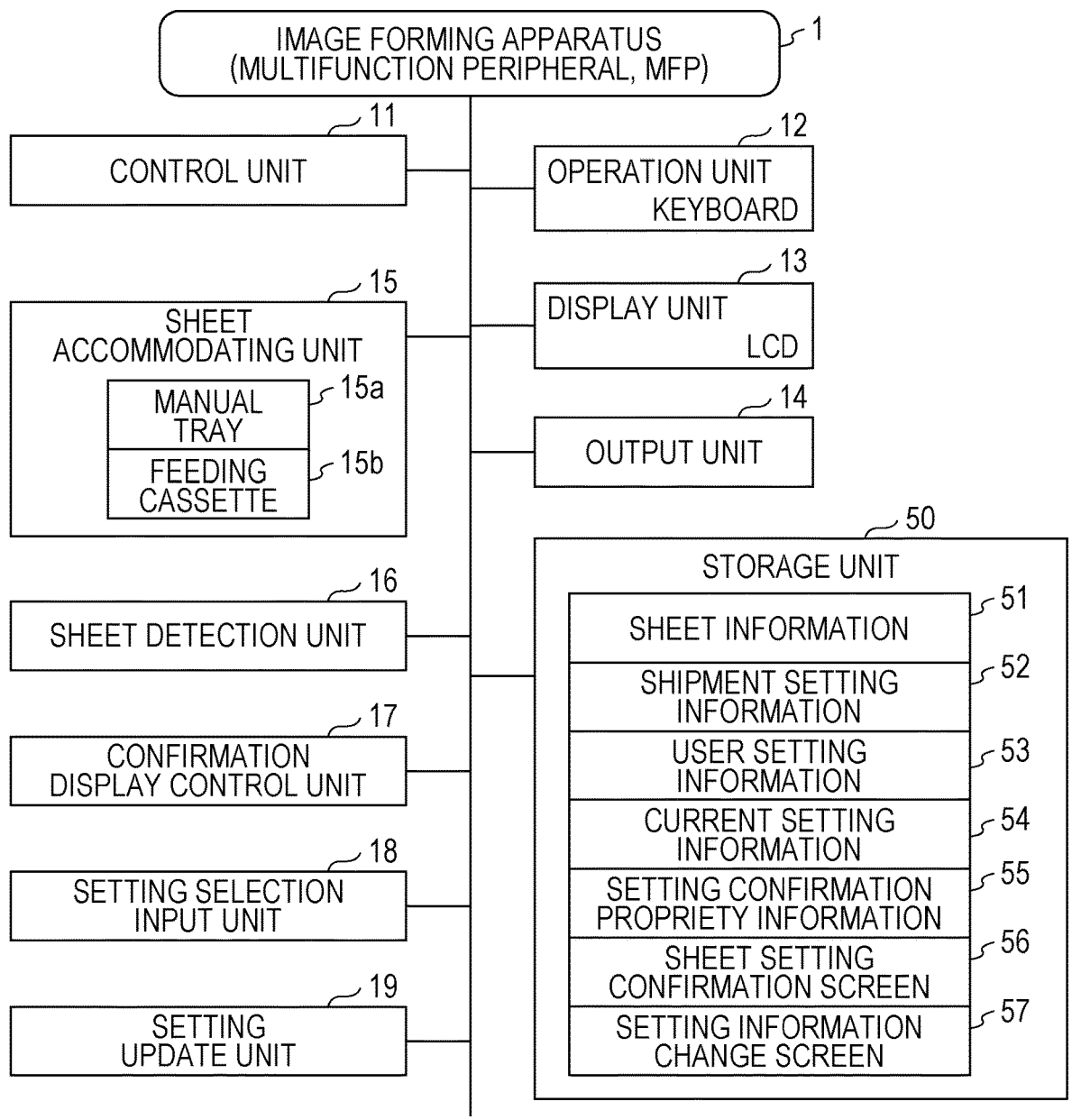
FIG. 2 is a structural block diagram of an exemplary embodiment of the image forming apparatus of the disclosure.

FIG. 2 is a structural block diagram of an exemplary embodiment of the image forming apparatus of the disclosure.

In FIG. 2, the image forming apparatus (MFP) 1 of the disclosure mostly includes a control unit 11, the operation unit 12, the display unit 13, an output unit 14, a sheet accommodating unit 15, a sheet detection unit 16, a confirmation display control unit 17, a setting selection input unit 18, a setting update unit 19, and a storage unit 50. The sheet accommodating unit 15 includes the manual tray 15a and the feeding cassette 15b. Further, the MFP 1 may include an image input unit, an image forming unit, a communication unit, and the like in order to execute the copying function, the document reading function, the communication function, and the like.

The control unit 11 is a part that controls operations of components such as the operation unit 12 and is implemented by a microcomputer mostly constituted by a CPU, a ROM, a RAM, an I/O controller, a timer, and the like.

The CPU executes a sheet detection function, a confirmation display control function, and the like of the disclosure through organic operations of various types of hardware on the basis of a control program stored in the ROM or the like in advance.

The operation unit 12 is a part by which information of a character or the like is input, setting information of a sheet or the like is selected and input, or a function is selected and input, and a keyboard, a mouse, a touch panel, or the like is used therefor, for example. In the disclosure, in particular, sheet size information and sheet type information are set and input.

The display unit 13 is a part displaying information and displays the sheet setting information that is currently set, information used for execution of each of functions, a result of execution of the function, or the like in order to inform the user. For example, an LCD, an organic EL display, or the like is used, and in a case where the touch panel is used as the operation unit 12, the touch panel is arranged in an overlaid state on the display unit.

The output unit 14 is a part outputting image information and corresponds to, for example, a printer that prints the image information on a paper medium for output. A size of information to be printed is adjusted on the basis of the sheet setting information that is currently set and the information to be printed is subjected to printing control according to quality of a sheet that is set, and the paper medium on which the information is printed is output. In this case, the output of the information is not limited to printing and may be storage of the information in an external storage medium such as a USB memory or transmission of the information to another information processing apparatus or a server via a network such as the Internet.

The sheet accommodating unit 15 is a part that accommodates a sheet on which image information or the like is printed and includes the manual tray 15a and the feeding cassette 15b as described above. Hereinafter, the accommodation of the sheet in the sheet accommodating unit 15 includes both placing (or putting) of the sheet on the manual tray 15a and accommodation of the sheet in the feeding cassette 15b.

The manual tray 15a is a placement table on which a desired sheet to be printed by the user is able to be placed as described above and the sheet is placed so as to contact a guide member attached to the manual tray 15a. On the manual tray 15a, approximately one to ten or more sheets having various sizes and types are able to be placed. The manual tray 15a includes a sheet detection unit described below to detect that a sheet is newly placed on the manual tray 15a (detection of sheet feeding) or that no sheet placed on the manual tray 15a is left (detection of sheet shortage).

The feeding cassette 15b is a container in which a sheet used for printing is accommodated and one or more feeding cassettes 15b are attached in accordance with a scale of the apparatus. A plurality of sheets in the same standard size are able to be mostly accommodated in one feeding cassette 15b. The feeding cassette 15b also includes a sheet detection unit to detect sheet feeding or sheet shortage.

In exemplary embodiments below, display and printing when a sheet is placed mostly on the manual tray 15a in the sheet accommodating unit 15 will be described below. Note that, similar processing may be performed also when a sheet is accommodated in the feeding cassette 15b and the manual tray 15a can be replaced with the feeding cassette 15b as appropriate.

The sheet detection unit 16 is a part detecting whether or not there is a sheet in the sheet accommodating unit 15. That is, the sheet detection unit 16 detects whether or not there is a sheet on the manual tray 15a and the feeding cassette 15b that serve as the sheet accommodating unit 15. For example, the sheet detection unit 16 detects whether or not a sheet is placed on the manual tray 15a and further detects whether or not no sheet is left. As the sheet detection unit 16, a press button switch or an optical sensor is used. For example, in a vicinity of the sheet inlet of the manual tray 15a, through which the sheet placed on the manual tray 15a is taken into inside of an apparatus body, the press button switch that partially protrudes from the upper surface of the manual tray 15a is attached.

When the sheet is placed on the manual tray 15a, the press button switch is pressed down, a contact of the switch is closed, and a signal (feeding detection signal) indicating that the press button switch is pressed down is output, and when the CPU receives the feeding detection signal, it is detected that there is a sheet on the manual tray 15a (sheet feeding).

To the contrary, when no sheet placed on the manual tray 15a is left in a state where the sheet feeding is detected, the press button switch that is pressed down is released and the contact of the switch is opened, so that the signal (feeding detection signal) indicating that the press button switch is pressed down is not output. When it is detected that the CPU shifts from a state of receiving the feeding detection signal to a state of not receiving the feeding detection signal, it is detected that no sheet is left on the manual tray 15a (sheen shortage). According to the disclosure, in a case where the sheet detection unit 16 detects that a sheet is supplied to the sheet accommodating unit 15 like the manual tray 15a, the confirmation display control unit 17 described below automatically causes the display unit 13 to display a sheet setting confirmation screen.

The confirmation display control unit 17 is a part that generates the sheet setting confirmation screen and causes the display unit 13 to display the sheet setting confirmation screen. The sheet setting confirmation screen is a screen which includes sheet setting information stored in the storage unit and on which a content of current sheet setting information is confirmed by the user, and is a screen as illustrated in FIG. 6 described below. For example, in a case where sheet feeding to the manual tray 15a is detected by the sheet detection unit 16, the confirmation display control unit 17 reads out current sheet setting information (current setting information) from the storage unit 50, acquires sheet size information and sheet type information that are included in the current setting information, generates a sheet setting confirmation screen that includes a content of the sheet size information and the sheet type information that are acquired, and causes the display unit 13 to display the generated sheet setting confirmation screen.

Figure 11:
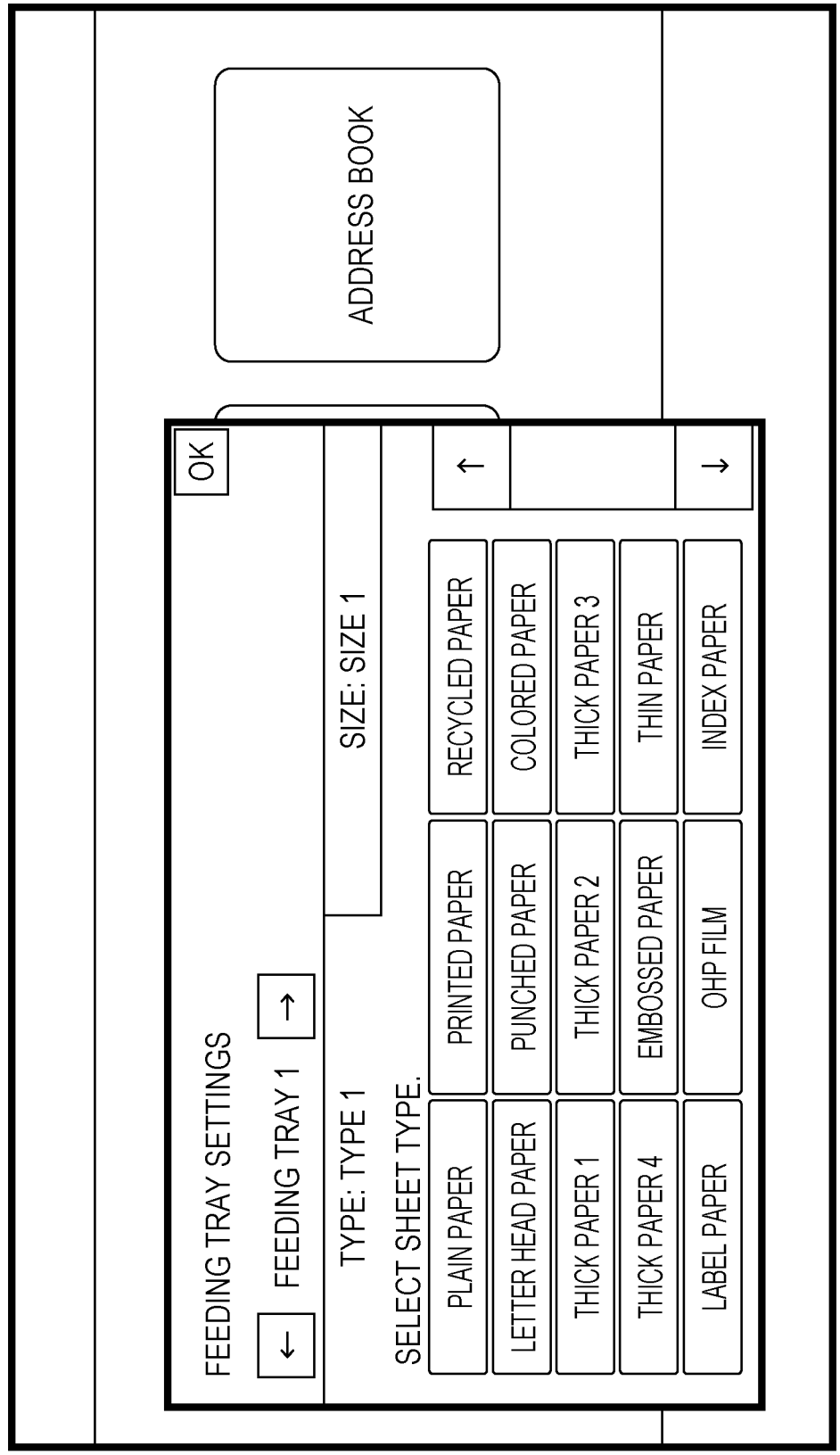
FIG. 11 is an explanatory view of an exemplary embodiment of a setting information change screen displayed on the display unit of the image forming apparatus of the disclosure.
Figure 13:
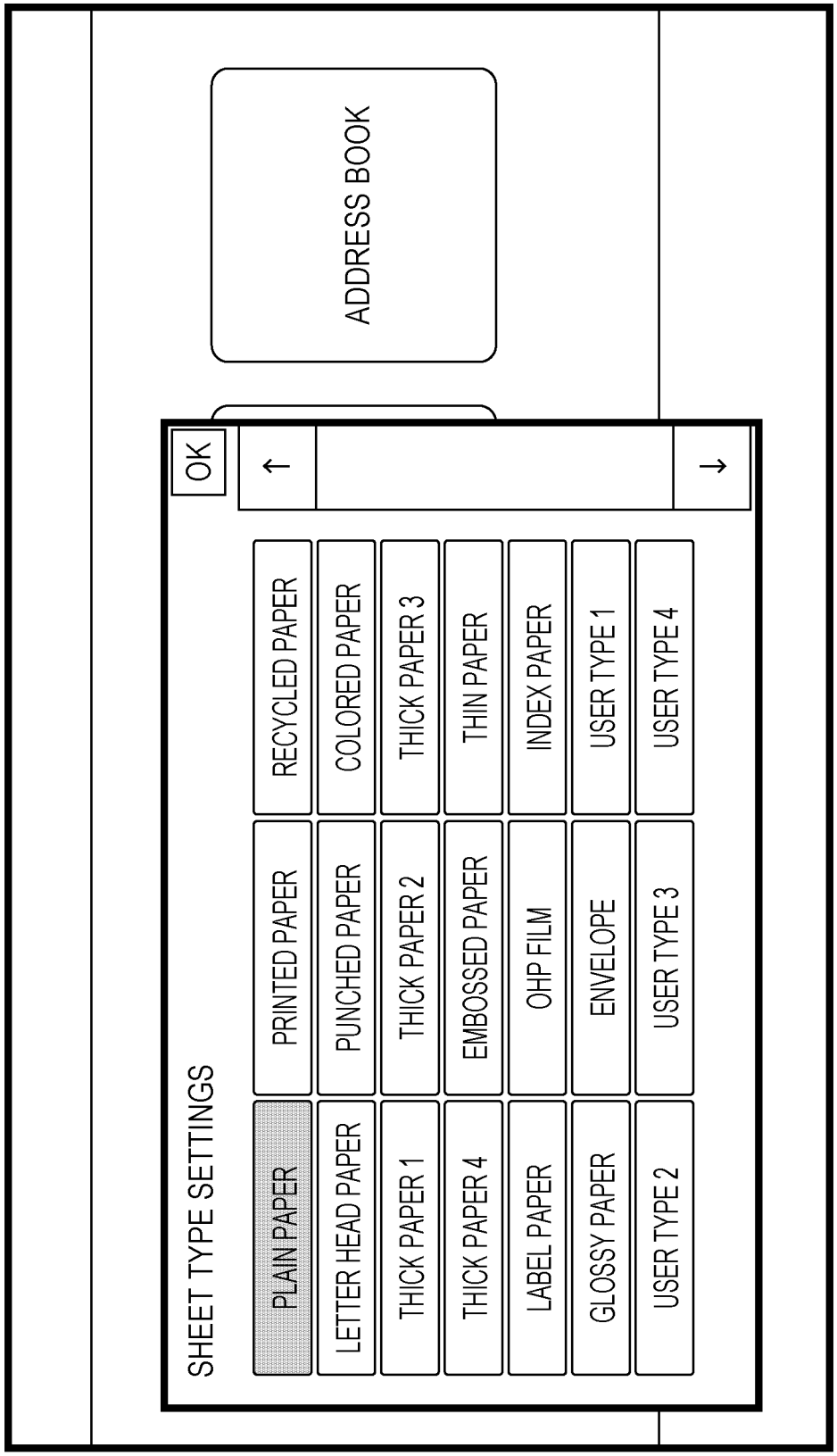
FIG. 13 is an explanatory view of an exemplary embodiment of the setting information change screen displayed on the display unit of the image forming apparatus of the disclosure.
Figure 14:
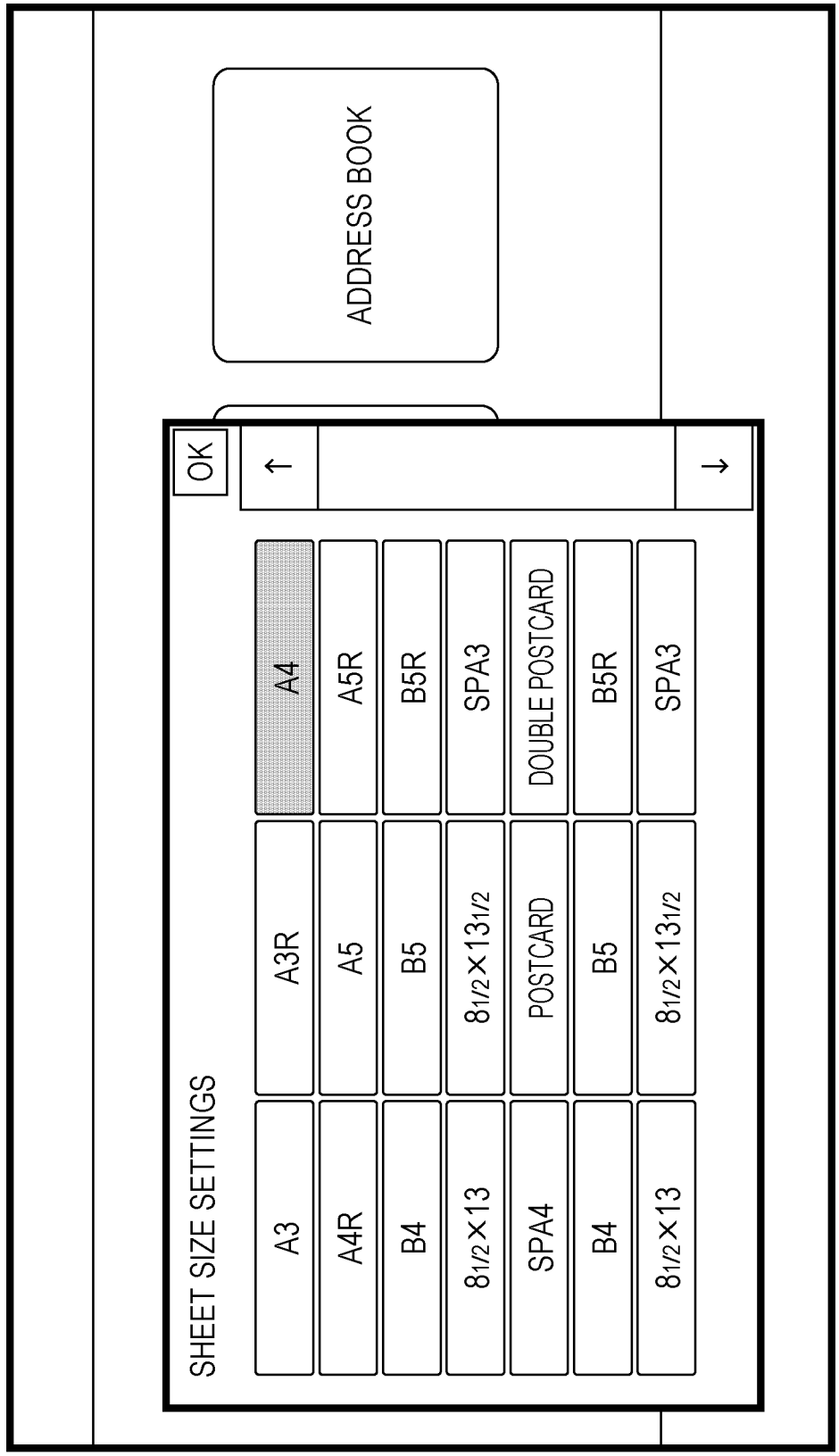
FIG. 14 is an explanatory view of an exemplary embodiment of the setting information change screen displayed on the display unit of the image forming apparatus of the disclosure.

The setting selection input unit 18 is a part by which a content of a setting item such as a sheet size or a sheet type included in the sheet setting information is selected and input. The selection and input may be performed by displaying a given setting information change screen 57 as illustrated in FIG. 11, 13, or 14 described below. The setting information change screen 57 includes a selection input screen for selecting and inputting a sheet type and a selection input screen for selecting and inputting a sheet size. For example, to set or change a sheet size, the selection input screen for a sheet size is displayed, and the user selectively inputs a desired sheet size from among a plurality of sheet sizes displayed in the selection input screen. Additionally, to set or change a sheet type, the selection input screen for a sheet type is displayed, and the user selectively inputs a desired sheet type from among a plurality of sheet types displayed in the selection input screen.

The selection and input of the sheet setting information such as the sheet size or the sheet type are performed in a case where the user confirms the current sheet setting information (current setting information) after causing the display unit 13 to display the sheet setting confirmation screen and determines that a change of a setting item is desired. On the other hand, in a case where the user confirms the current sheet setting information (current setting information) after displaying the sheet setting confirmation screen on the display unit 13 and determines that a change of a setting item is not desired, the selection and input of the sheet setting information are not performed.

The setting update unit 19 is a part that updates the current sheet setting information (current setting information) stored in the storage unit 50. Here, the setting update unit 19 changes a content of a setting item of the current sheet setting information that is stored to a content of a setting item that is selected and input by the setting selection input unit 18. In this manner, when the user performs, with use of the setting selection input unit 18, an input operation of changing the content of the setting item of the sheet setting information so as be suitable for the sheet to be used for printing, the content of the setting item of the current sheet setting information is updated and printing is executed with a setting content suitable for the sheet to be used for printing.

The storage unit 50 is a part that stores information or a program used for executing functions of the image forming apparatus of the disclosure, and a semiconductor storage element such as a ROM, a RAM, or a flash memory, a storage device such as HDD or SSD, or other storage media is used therefor.

In the storage unit 50, for example, sheet information 51, shipment setting information 52, user setting information 53, current setting information 54, setting confirmation availability information 55, a sheet setting confirmation screen 56, the setting information change screen 57, and the like are stored.

In the information that is stored, while information that may be, for example, changed or deleted is stored in the flash memory or the HDD, information, such as the shipment setting information 52, which does not allow change may be stored in the ROM. Three pieces of information of the shipment setting information 52, the user setting information 53, and the current setting information 54 correspond to the aforementioned sheet setting information for specifying a sheet to be printed. The sheet setting information is information in which a content of a setting item of a sheet to be used for printing is stored, and such three pieces of information may be all stored or at least only the current setting information 54 may be stored.

FIGS. 3A to 3E are explanatory views of an exemplary embodiment of information stored in the storage unit 50 of the image forming apparatus.

The sheet information 51 is information in which information about a sheet usable in the image forming apparatus is stored in advance. FIG. 3A illustrates an exemplary embodiment of the sheet information 51. For example, a sheet type and a sheet size are stored as the sheet information 51. As the sheet type, names of various kinds (types) of sheets usable in the image forming apparatus, such as plain paper, recycled paper, thick paper, and label paper, are stored in advance. Moreover, a user type 1 may be stored as a sheet type that is uniquely defined by the user.

As the sheet size, names of standard sizes, such as A3 and A4, and non-standard sizes, such as a letter and a postcard, which are a plurality of sheet sizes useable in the image forming apparatus, are stored in advance. Moreover, a user 1 and a user 2 may be stored as sheet sizes that are uniquely defined by the user.

The sheet information 51 is used for a content of a setting item such as the current setting information 54 described below, and is further used for a display item of a screen (sheet size input screen) for selecting and inputting a sheet size or a screen (sheet type input screen) for selecting and inputting a sheet type. Additionally, the sheet information 51 is desired to be stored in a non-volatile rewritable storage device such as HDD so as to allow change or addition by a manager or the user of the image forming apparatus.

The shipment setting information 52 means sheet setting information that is set in advance and written in the storage unit 50 at a time of shipment of the image forming apparatus. The shipment setting information 52 is desired to be stored in a non-volatile read-only storage element such as a ROM so that a state of the image forming apparatus is able to be returned to an initial state at a time of shipment.

FIG. 3B illustrates an exemplary embodiment of the shipment setting information 52. For example, a sheet type and a sheet size are stored as the shipment setting information 52. In FIG. 3B, plain paper is set in advance as the sheet type of the shipment setting information 52 and A4 is set in advance as the sheet size of the shipment setting information 52. In a case where a sheet used for printing by the user is plain paper in an A4 size, use of the shipment setting information 52 enables execution of appropriate printing.

The user setting information 53 means sheet setting information that is set in advance by the manager or the user of the image forming apparatus after an operation of the image forming apparatus starts and stored in the storage unit 50. The user setting information 53 is desired to be stored in a non-volatile rewritable storage device such as HDD so as to allow change, addition, or deletion by the manager or the user.

FIG. 3C illustrates an exemplary embodiment of the user setting information 53. For example, a sheet type and a sheet size are stored as the user setting information 53. In FIG. 3C, label paper is set in advance as the sheet type of the user setting information 53 and B5 is set in advance as the sheet size of the user setting information 53.

For example, in a case where most users who use the image forming apparatus usually use label paper in a B5 size, the user setting information 53 of FIG. 3c may be stored in advance, and even when the current setting information 54 stored in the storage unit is different from the user setting information 53, whenever the user uses the image forming apparatus next time, the user setting information 53 may be preferentially rewritten to the current setting information 54.

As a result, in an environment where a sheet that is set to the user setting information 53 is decided almost fixedly as a sheet that is normally used, the user is hardly requested to perform an input operation of changing the sheet setting information, thus making it possible to reduce an operation burden on the user.

The user setting information 53 may be set in accordance with necessity and may not be set in an environment where various sheets are used. Alternatively, in a case where a sheet to be used is decided for each of users, different sheet settings may be stored for each or the users as the user setting information 53.

The current setting information 54 is sheet setting information that is currently used when processing of printing or the like is executed, out of the sheet setting information stored in the storage unit 50, and is sheet setting information that basically corresponds to a sheet that is currently placed on (accommodated in) the sheet accommodating unit such as the manual tray. The current setting information 54 is also setting information of a sheet that is used in previous processing of printing or the like. That is, after the processing of printing or the like is executed in a previous time, sheet setting information that is used for the processing of printing or the like is stored in the current setting information 54 as it is. The current setting information 54 is stored in a non-volatile rewritable storage device such as HDD so as to allow update by the setting update unit 19.

FIG. 3D illustrates an exemplary embodiment of the current setting information 54. For example, a sheet type and a sheet size are stored as the current setting information 54. In FIG. 3D, recycled paper is set in advance as the sheet type of the current setting information 54 and A4 is set in advance as the sheet size of the current setting information 54. In the disclosure, at least the sheet type and the sheet size for the manual tray are stored in the current setting information 54. In this case, the current setting information 54 of not only the manual tray but also the feeding cassette may be stored and the current setting information 54 of each of the manual tray and the feeding cassette may be stored as the current setting information 54. In a case where there are a plurality of feeding cassettes, the current setting information 54 of each of the feeding cassettes may be stored.

The current setting information 54 is information that is stored without fail, and sheet setting information that is used in previous processing of printing or the like may be stored as it is to be set as the current setting information 54, and additionally, the shipment setting information 52 or the user setting information 53 may be read out to be set as the current setting information 54. Moreover, the current setting information 54 is used for a content of a setting item of the sheet setting information displayed in the sheet setting confirmation screen 56. That is, by using a content of a setting item of the current setting information 54, the sheet setting confirmation screen 56 is generated.

The setting confirmation availability information 55 is information by which whether or not to display the sheet setting confirmation screen 56 is set in advance. FIG. 3E illustrates an exemplary embodiment or the setting confirmation availability information 55. For example, in a case where "1" meaning that the user confirms the sheet setting information is set (confirmation is allowed) the sheet setting confirmation screen 56 is displayed on the display unit 13. Alternatively, in a case where "0" meaning that the user does not confirm the sheet setting information is set (confirmation is not allowed), the sheet setting confirmation screen 56 is not displayed on the display unit 13. Setting of the setting confirmation availability information 55 is desired to be changeable by the manager or the user of the image forming apparatus and the setting confirmation availability information 55 is stored in a non-volatile rewritable storage device such as HDD.

In a case where "1" is set to the setting confirmation availability information 55 (confirmation is allowed), when the sheet is placed on the manual tray, the sheet setting confirmation screen 56 is automatically displayed on the display unit. By seeing a display content of the screen, the user is able to easily confirm the current sheet setting information without performing a special input operation after placing the sheet on the manual tray.

On the other hand, in a case where "0" is set to the setting confirmation availability information 55 (confirmation is not allowed), when the sheet is placed on the manual tray, the sheet setting confirmation screen 56 is not displayed on the display unit and start of processing of printing or the like is enabled. In a case where a sheet to be used is habitually decided fixedly, by setting "0" to the setting confirmation availability information 55, the user is able to promptly shift to processing of printing start or the like upon placement of the sheet on the manual tray, without confirming the sheet setting information.

The sheet setting confirmation screen 56 is a screen in which information including the current setting information 54 is mostly displayed and is a screen on which the user confirms the sheet setting information that is currently used for executing processing of printing or the like. As described above, when it is detected by the sheet detection unit 16 that the sheet is fed to the sheet accommodating unit 15, the sheet setting confirmation screen 56 is generated by the confirmation display control unit 17 with use of the current setting information 54 stored in the storage unit 50 and is displayed on the display unit 13. In the sheet setting confirmation screen 56, in addition to the current setting information 54, any information of the shipment setting information 52 and the user setting information 53 may be displayed.

FIG. 6 illustrates an exemplary embodiment of the sheet setting confirmation screen 56. Here, the sheet setting confirmation screen 56 in which plain paper is stored as the sheet type of the current setting information 54 and A4 is stored as the sheet size thereof is indicated. The sheet type (plain paper) that is stored is displayed on the right side of characters of type and the sheet size (A4) that is stored is displayed on the right side of characters of size. Though a sentence of "When different from sheet to be printed, press [change]." is also displayed for the user to instruct an operation performed next time in FIG. 6, the sentence may not be displayed.

Additionally, since the sheet setting confirmation screen 56 is a screen for confirming the sheet setting information, the sheet type and the sheet size that are displayed are not able to be changed in a state where the screen 56 is displayed. Then, as illustrated in FIG. 6, areas where "change" and "OK" are displayed are provided in the sheet setting confirmation screen 56 to enable an input operation. The area where characters of "change" are displayed is a selection input area where an input to change the sheet setting information is performed. That is, the area is an area that is selected and input when the sheet setting information of at least any one of the sheet type and the sheet size is changed to have a content different from the sheet type or the sheet size that is displayed.

In a case where the selection input area where the characters of "change" are displayed is selected and input by the user, a selection input screen that allows change of the sheet setting information is displayed. The selection input screen corresponds to the setting information change screen 57 described above. Then, a state in which an input to change a setting item of the sheet setting information is able to be performed by the setting selection input unit 18 is provided, and the user may perform an input operation of changing the sheet setting information of the sheet type, the sheet size, or the like by using the selection input screen.

The area where the characters of "OK" are displayed is a selection input area in which an input meaning that confirmation of the sheet setting information is completed is performed and which is selected and input when display of the sheet setting confirmation screen 56 is finished. In a case where the user sees the sheet type and the sheet size that are displayed in the sheet setting confirmation screen 56 and setting matching a sheet to be printed from now on has been already made, the user selects and inputs the area where the characters of "OK" are displayed.

In a case where the selection input area where the characters of "OK" are displayed is selected and input by the user, the sheet setting confirmation screen 56 is deleted to provide a state ho which an input to start printing processing by the user is enabled. For example, a screen in which an input operation to start printing processing is enabled is displayed. Alternatively, a reference screen that is displayed on the display unit 13 when a specific function is not executed may be displayed.

Figure 7:
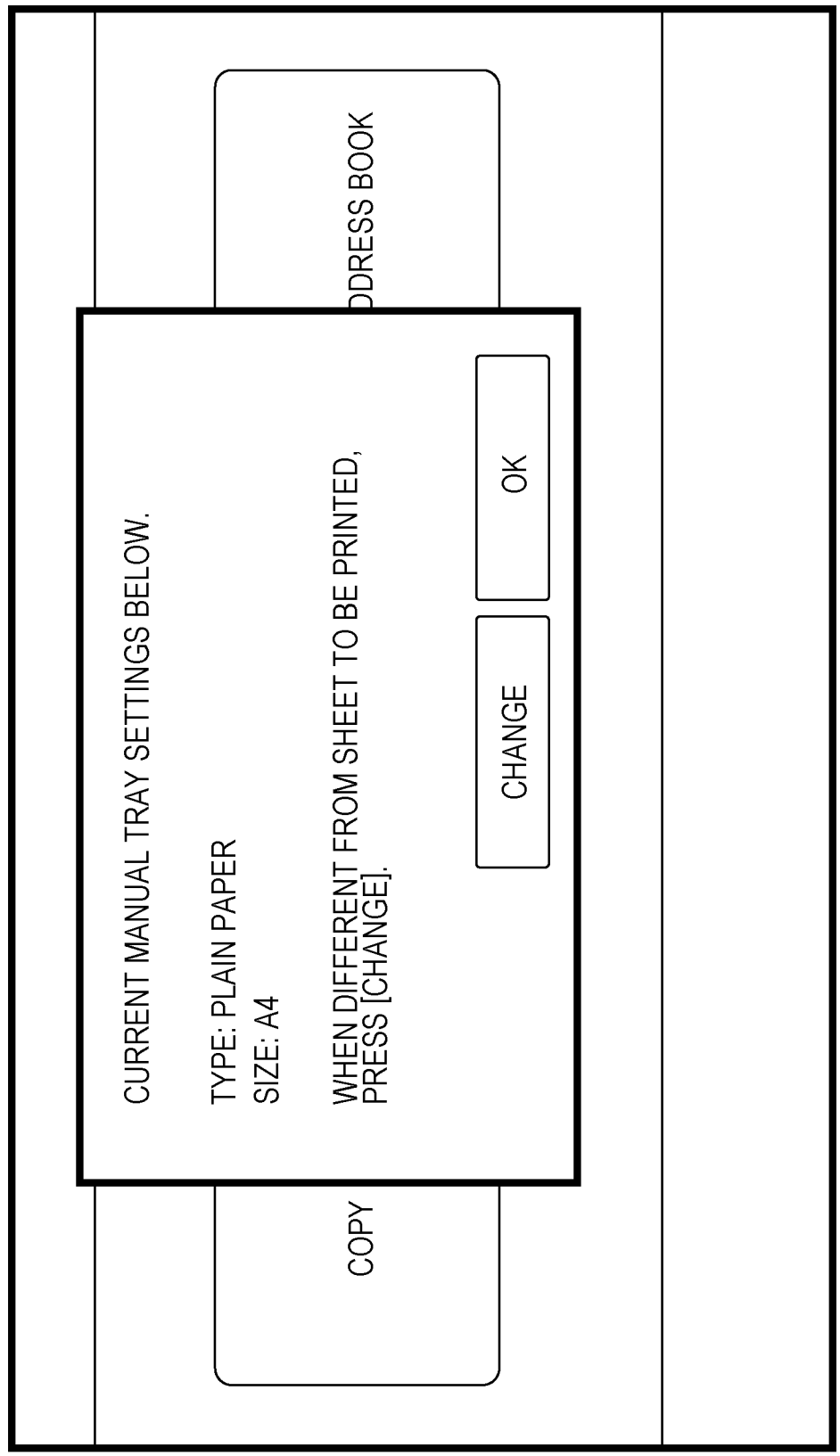
FIG. 7 is an explanatory view of an exemplary embodiment of the sheet setting confirmation screen displayed on a display unit of the image forming apparatus of the disclosure.
Figure 8:
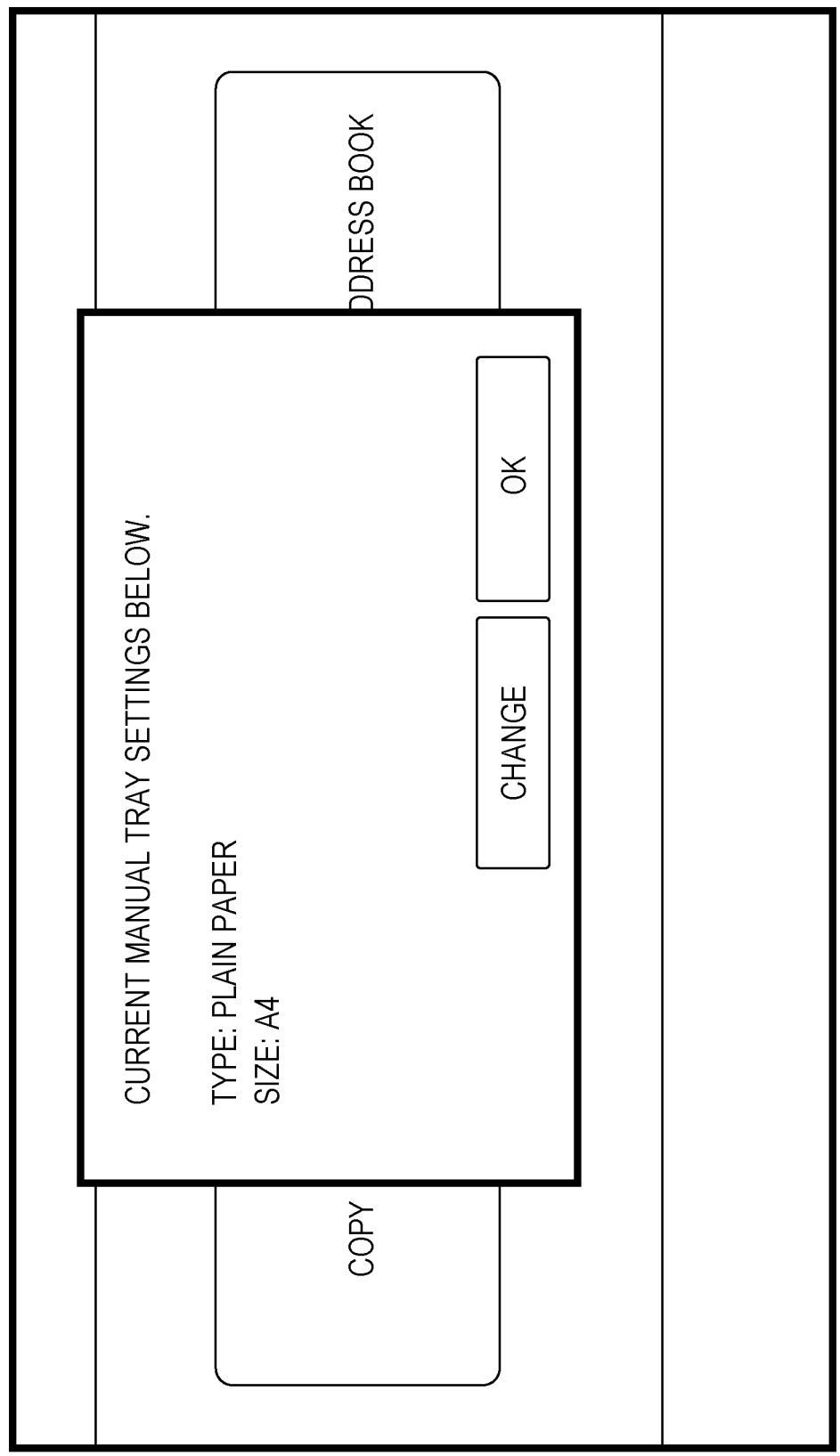
FIG. 8 is an explanatory view of an exemplary embodiment of the sheet setting confirmation screen displayed on the display unit of the image forming apparatus of the disclosure.

The sheet setting confirmation screen 56 may be displayed largely in an entire display screen of the display unit 13 so that the user easily confirms a content of the sheet setting information. FIGS. 7 and 8 are explanatory views of an exemplary embodiment in which the sheet setting confirmation screen 56 is displayed as a pop-up screen. For example, in a case where a specific function is not executed, the sheet setting confirmation screen 56 is displayed in an overlaid state on a screen that is currently displayed on the display unit 13. The sheet setting confirmation screen 56 may be displayed in an overlaid state on the reference screen described above so as to be at a forefront on a part of the reference screen.

Figure 9A:
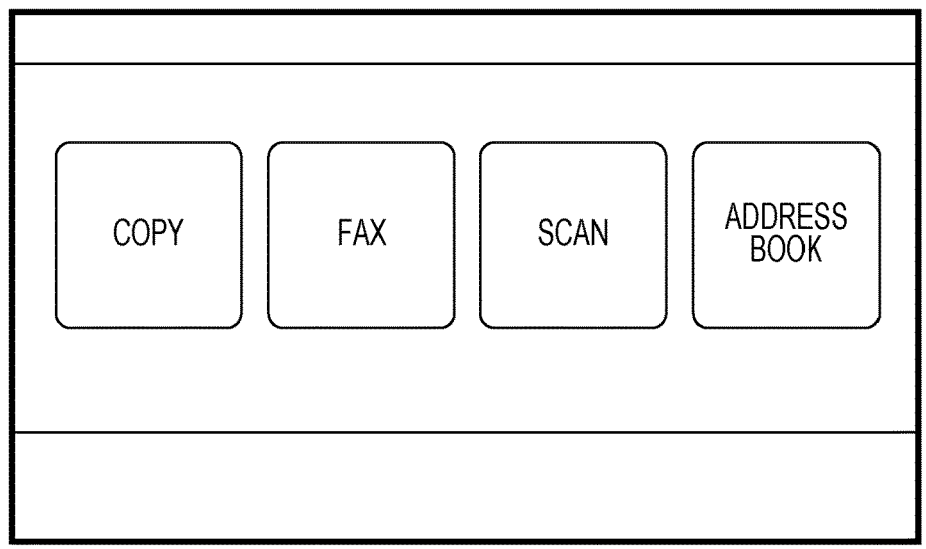
FIGS. 9A to 9C are explanatory views of an exemplary embodiment of a reference screen displayed on the display unit of the image forming apparatus of the disclosure.
Figure 9B:
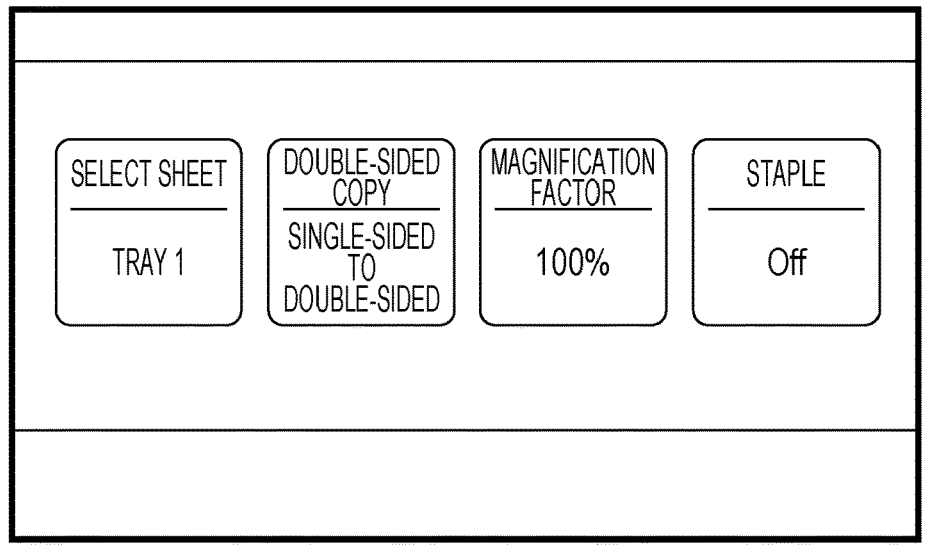
Figure 9C:
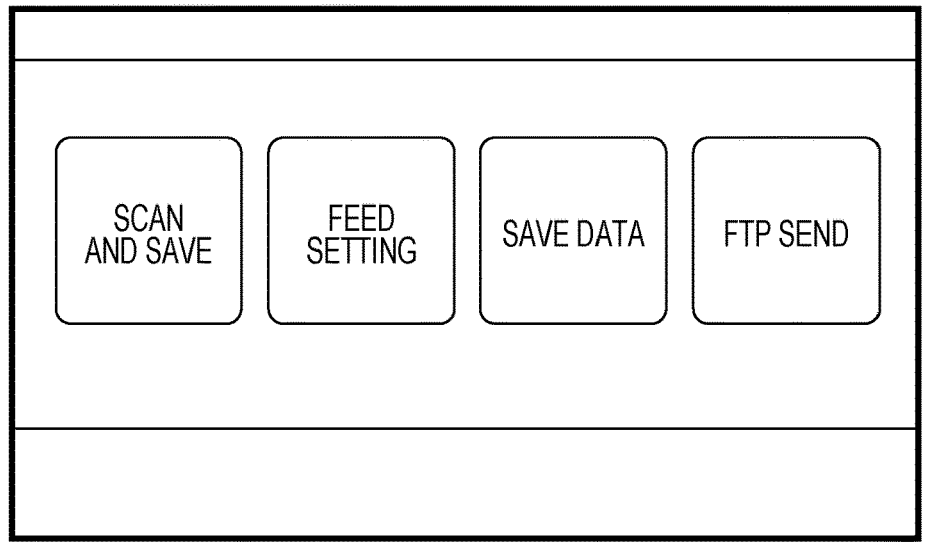

FIGS. 9A to 9C are explanatory views of an exemplary embodiment of the reference screen serving as a background when the sheet setting confirmation screen 56 is displayed in a popped-up manner. FIGS. 9A to 9C illustrate an exemplary embodiment of three reference screens. FIG. 9A illustrates a screen displayed after power of the apparatus is turned on. FIG. 9B illustrates a screen that is displayed in a case where an area where "copy" is displayed is selected and input when the screen of FIG. 9A is displayed. FIG. 9C illustrates a screen displayed in a case where a specific input operation is performed when the screen of FIG. 9A is displayed.

In a case where a sheet is supplied to the sheet accommodating unit such as the manual tray in a state where any of the three reference screens is displayed, the sheet setting confirmation screen 56 is displayed as a pop-up screen as in FIG. 7 or 8.

The aforementioned setting confirmation availability information 55 is information by which whether or not to display the sheet setting confirmation screen 56 is set, and, in addition to the propriety information, a background screen on which the sheet setting confirmation screen 56 is able to be displayed in a popped-up manner may be individually set in advance.

Alternatively, to the contrary, a background screen on which the pop-up display of the sheet setting confirmation screen 56 is not allowed may be set. The background screen on which the pop-up display of the sheet setting confirmation screen 56 is not allowed is a screen which may cause a disadvantage in such a manner that a setting content is not normally input when the sheet setting confirmation screen 56 is displayed in a popped-up manner to be overlaid on the screen while the user performs a setting input of predetermined information. For example, as the background screen on which the pop-up display of tree sheet setting confirmation screen 56 is not allowed, a screen during display of a system setting screen, a screen during display of an instruction manual, a screen during execution of a program or an application (OSA), a log-in screen, a finish mode screen, a manual tray setting screen, a screen during execution of a walk-up job, a screen during display of jam map/jam guidance, a screen during display of replacement guidance of a toner collection container, a screen during a power-saving mode, a screen during display of a simulation screen, or the like may be set.

In a case where a screen set in this manner, which may cause a disadvantage when the sheet setting confirmation screen 56 is displayed in a popped-up manner to be overlaid on the screen, is displayed on the display unit, even when the sheet is supplied to the manual tray, display of the sheet setting confirmation screen 56 is not allowed. Additionally, in a case where a background screen on which the pop-up display of toe sheet setting confirmation screen 56 is not allowed is set in advance, when a screen other than such a screen is displayed on the display unit, the pop-up display of the sheet setting confirmation screen 56 may be permitted.

Figure 12:
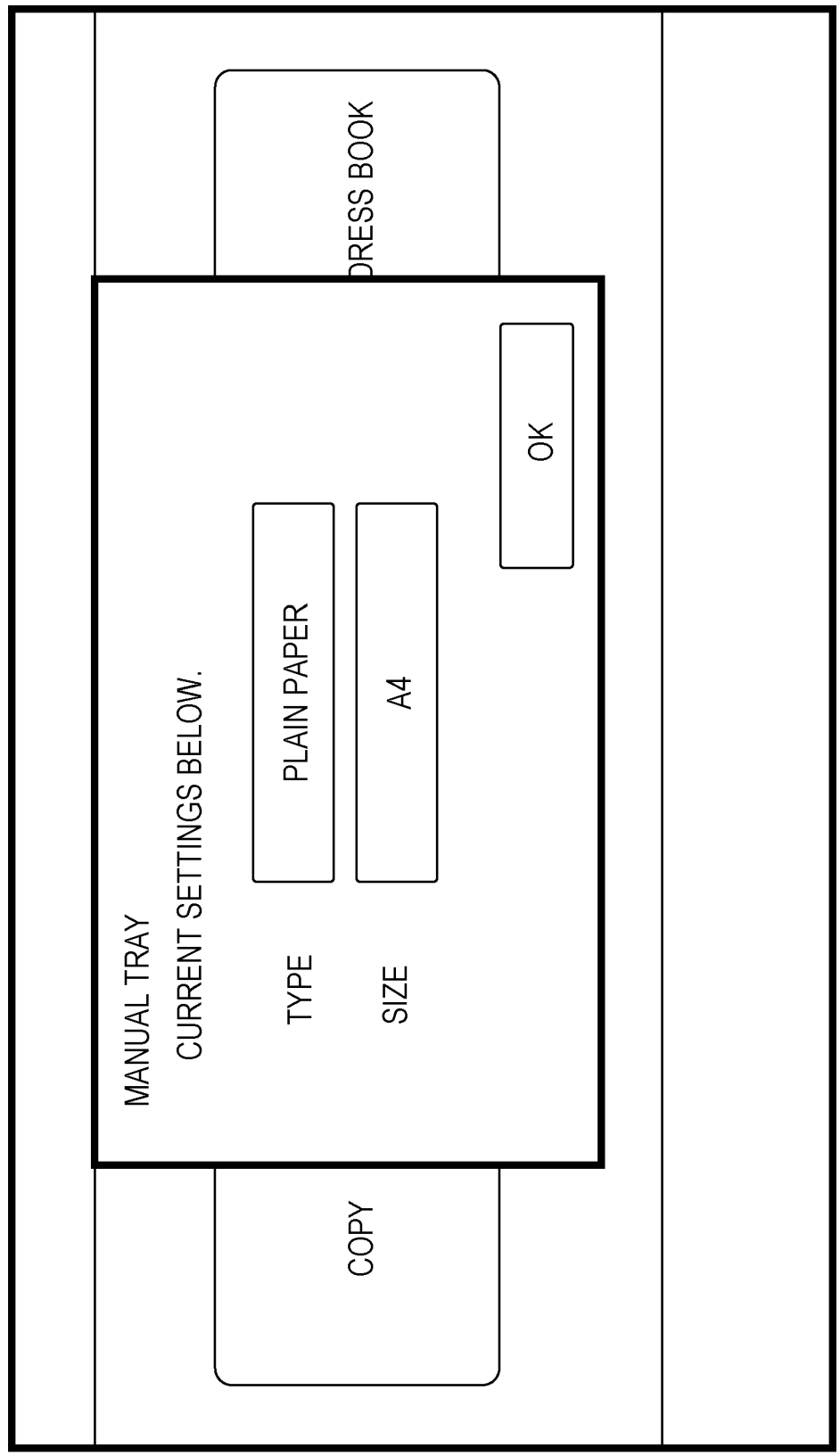
FIG. 12 is an explanatory view of an exemplary embodiment of the sheet setting confirmation screen displayed on the display unit of the image forming apparatus of the disclosure.

FIG. 12 is an explanatory view of another exemplary embodiment of a display screen when the sheet setting confirmation screen 56 is displayed as a pop-up screen.

Also in the sheet setting confirmation screen 56 of FIG. 12, similarly to FIG. 6, a sheet type and a sheet size that are currently stored are respectively displayed on the right side of characters of type and characters of size. Note that, in FIG. 12, areas where the sheet type and the sheet size are displayed are areas where selection and input are allowed.

By seeing the sheet setting confirmation screen 56 of FIG. 12, the user confirms whether or not setting of the current sheet type and sheet size corresponds to the sheet that is supplied. When desiring to change the setting of the sheet type or the sheet size, the user may select and input the area where the sheet type or the sheet size is displayed.

Additionally, in FIG. 12, similarly to FIG. 6, an area where characters of "OK." are displayed is provided to allow selection and input meaning that confirmation of the sheet setting information is completed. In a case where the user selects and inputs the area where the characters of "OK" are displayed, the display of the sheet setting confirmation screen 56 of FIG. 12 is finished.

For example, when the area where the sheet type is displayed in FIG. 12 is selected an input, the screen is switched to a screen in which selection and input of the sheet type are allowed. That is, the display on the display unit is changed from the sheet setting confirmation screen 56 of FIG. 12 to the setting information change screen 57 as illustrated in FIG. 13. The user may select and input a desired sheet type while seeing the setting information change screen 57 of FIG. 13. Additionally, to return to the sheet setting confirmation screen 56 of FIG. 12 from the setting information change screen 57 of FIG. 13, for example, the user may select and input an area where "OK" is displayed at an upper right part of the setting information change screen 57.

Moreover, when the user selects and inputs the area where the sheet size is displayed in FIG. 12, the screen is switched to a screen in which selection and input of the sheet size are allowed. That is, the display on the display unit is changed from the sheet setting confirmation screen 56 of FIG. 12 to the setting information change screen 57 as illustrated in FIG. 14. The user may select and input a desired sheet size whale seeing the setting information change screen 57 of FIG. 14. Additionally, to return to the sheet setting confirmation screen 56 of FIG. 12 from the setting information change screen 57 of FIG. 14, similarly, the user may select and input an area where "OK" is displayed at an upper right part of the setting information change screen 57.

In the sheet setting confirmation screen 56 of FIG. 12, when the user selects and inputs an area where sheet setting information that is desired to be changed is displayed among two pieces of sheet setting information of the sheet type and the sheet size, the sheet setting confirmation screen 56 is switched to the setting information change screen 57 in which the sheet setting information that is desired to be changed is able to be directly selected and input, so that a change to the desired sheet setting information is able to be performed more easily and promptly.

The setting information change screen 57 is a screen in which the sheet setting information such as the sheet size and the sheet type is displayed as described above and is a screen in which the user is able to select and input a setting item of desired sheet setting information. As has been described above, FIGS. 11, 13, and 14 each indicate an exemplary embodiment of the setting information change screen 57.

<Display Processing of Sheet Setting Confirmation Screen of Image Forming Apparatus of Disclosure>

Here, a flowchart of an exemplary embodiment of display processing or the like of the sheet setting confirmation screen is indicated. In particular, processing when a sheet is placed on the manual tray in a state where a function of printing processing or the like is not executed and processing when a sheet is supplied to the manual tray because no sheet is left on the manual tray in a state where printing processing is executed will be described.

It is assumed that "1" meaning that the user confirms the sheet setting information is set in the setting confirmation availability information 55. It is assumed that the sheet setting information (sheet type and sheet size) used in printing processing that is executed in previous time is stored in the current setting information 54 of the storage unit 50.

Though processing when sheet detection in the manual tray is performed will be described in the following exemplary embodiments, almost similar processing is able to be performed also when sheet detection in the feeding cassette is performed.

Exemplary Embodiment 1

Figure 4:
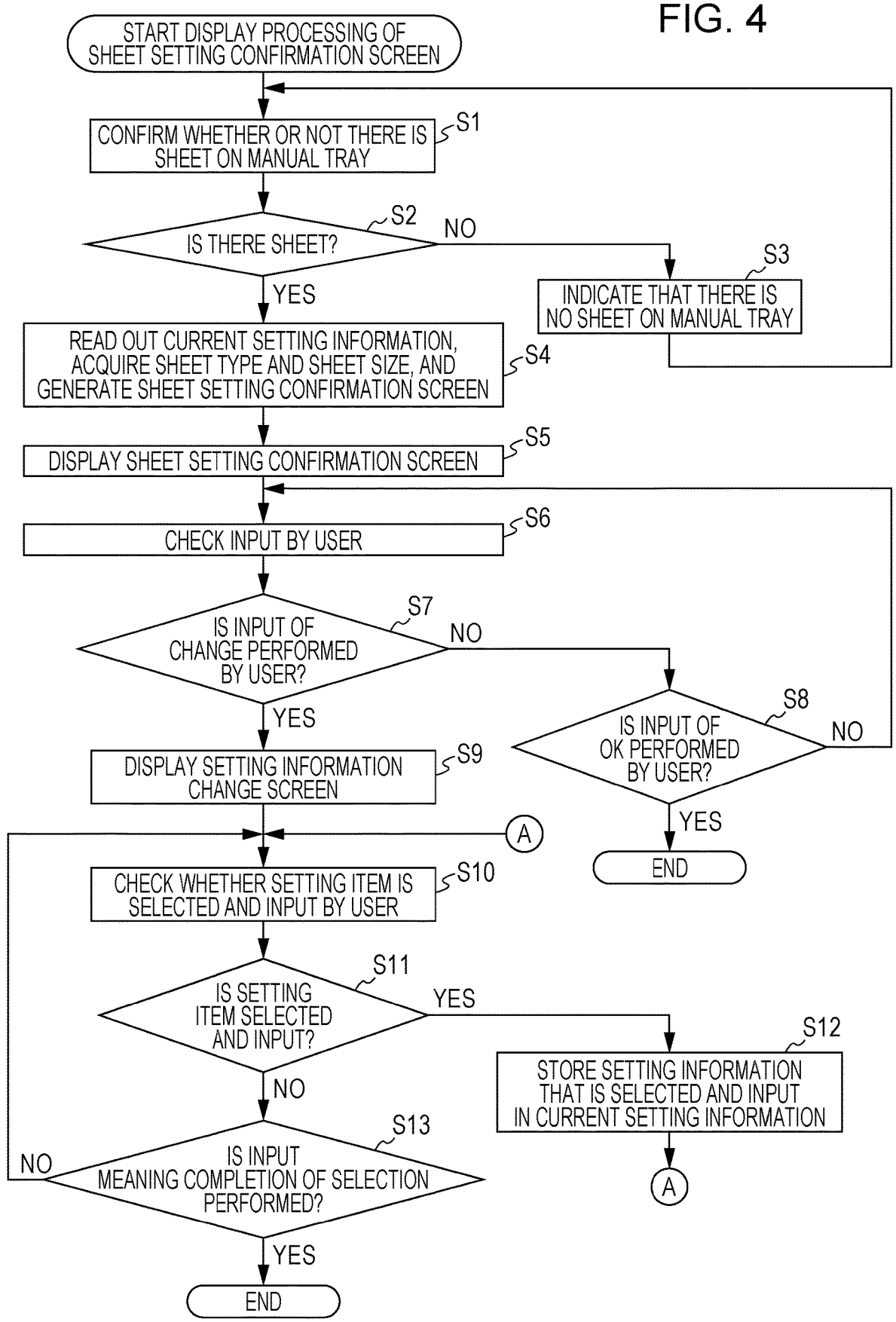
FIG. 4 is a flowchart of an exemplary embodiment of display processing or the like of a sheet setting confirmation screen in the image forming apparatus of the disclosure.

FIG. 4 illustrates a flowchart of an exemplary embodiment of display processing or the like of the sheet setting confirmation screen when a sheet is placed on the manual tray in the image forming apparatus of the disclosure.

In a state where a functional of printing processing or the like is not executed, the reference screen as illustrated in FIG. 9 described above is displayed on the display unit 13.

At step S1 in FIG. 4, the control unit 11 confirms whether or not there is a sheet on the manual tray 15*a* of the sheet accommodating unit 15. For example, the control unit 11 checks whether or not a feeding detection signal that is output from the press button switch that is the sheet detection unit 16 is received. The control unit 11 determines that there is a sheet on the manual tray 15*a* when the feeding detection signal is received, and determines that there is no sheet on the manual tray 15*a* when the feeding detection signal is not received.

At step S2, when it is determined that there is a sheet, the procedure proceeds to step S4, and when it is determined that there is no sheet, the procedure proceeds to step S3. At step S3, a message indicating that there is no sheet on the manual tray 15*a* is displayed on the display unit 13 and the procedure returns to step S1. Alternatively, the procedure may return to step S1 without displaying the message. When the message indicating that there is no sheet on the manual tray 15*a* is displayed, the user is able to confirm that a desired sheet may be placed on the manual tray 15*a*.

It is assumed that the user who is to perform printing by using the manual ray 15*a* goes to the image forming apparatus and places a desired sheet on the manual tray 15*a*. When the user places the sheet on the manual tray 15*a*, the feeding detection signal output from the sheet detection unit 16 is received, so that it is determined that there is a sheet and the procedure proceeds to step S4. At step S4, the confirmation display control unit 17 reads out the current setting information 54 stored in the storage unit 50 and acquires a sheet type and a sheet size that are included in the current setting information 54. Further, the confirmation display control unit 17 generates the sheet setting confirmation screen 56 by using a content of the sheet type and the sheet size that are acquired. That is, when the sheet detection unit 16 detects that the sheet is set on the manual tray 15*a*, the sheet setting confirmation screen 56 is displayed on the display unit 13.

At step S5, the confirmation display control unit 17 causes the display unit 13 to display the generated sheet setting confirmation screen 56. That is, the state where the reference screen as illustrated in FIG. 9 is displayed is switched to a state where the sheet setting confirmation screen 56 is displayed in a popped-up manner to be overlaid on the reference screen. For example, the sheet setting confirmation screen 56 as illustrated in FIG. 6 is displayed as a pop-up screen as illustrated in FIG. 7. Alternatively, the sheet setting confirmation screen 56 may be displayed as a pop-up screen as illustrated in FIG. 12. By seeing the content of the sheet type and the sheet size displayed in the sheet setting confirmation screen 56, the user confirms whether or not the sheet to be printed from now on has the same sheet type and sheet size as the sheet type and sheet size that are displayed.

Figure 10:
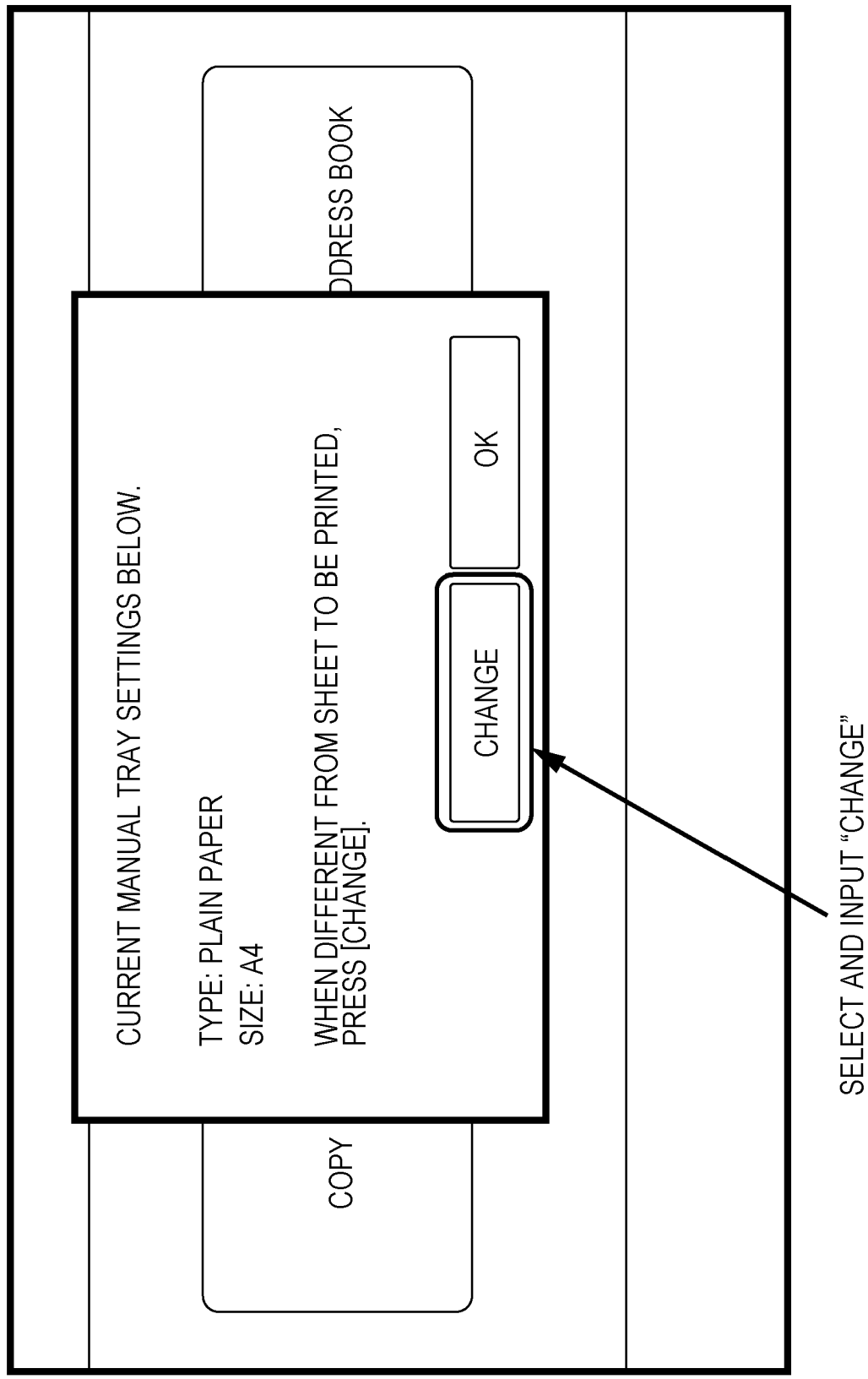
FIG. 10 is an explanatory view of an exemplary embodiment of the sheet setting confirmation screen displayed on the display unit of the image forming apparatus of the disclosure.

Since "change" and "OK." are displayed in the sheet setting confirmation screen 56 as illustrated in FIG. 6, in a case where the sheet to be printed has the same sheet type and sheet size as the sheet type and sheet size that are displayed, the user selects and inputs the area of "OK". On other hand, in a case where the sheet to be printed has different sheet type and sheet size from the sheet type and sheet size that are displayed, the user selects and inputs the area of "change". For example, when the touch panel is provided, the user selects and inputs the area of "change" by using his or her finger or an input pen in a state where the sheet setting confirmation screen 56 is displayed as illustrated in FIG. 10.

At step S6, whether or not there is an input by the user is checked.

At step S7, in a case where there is an input by the user to select and input the area of "change", the procedure proceeds to step S9, and otherwise, the procedure proceeds to step S8. At step S8, in a case where there is an input by the user to select and input the area of "OK", the procedure ends, and otherwise, the procedure returns to step S6. Note that, the case where the user selects and inputs the area of "OK" means that the sheet placed on the manual tray 15*a* by the user has the same content as the content of the sheet type and sheet size that are displayed in the sheet setting confirmation screen 56, so that the procedure proceeds to processing of starting printing after the flowchart of FIG. 4 ends. Since there is no problem in the current setting of the sheet, the user may perform an input operation to start printing.

Since the user selects and inputs the area of "change", the setting information change screen 57 is displayed on the display unit 13 at step S9. For example, when the user selects and inputs the area of "change" in a state where the sheet setting confirmation screen 56 of FIG. 10 is displayed, the screen of the display unit 13 is switched from the sheet setting confirmation screen 56 of FIG. 10 to the setting information change screen 57 of FIG. 11.

As described above, though the selection input screen for a sheet size the selection input screen for a sheet type, and the like are cited as the setting information change screen 57, a screen in which the sheet type is selected and input is illustrated in FIG. 11. In a case where the user selects and inputs the sheet size, by selecting and inputting an area where "size" is displayed in the setting information change screen of FIG. 11, the screen is switched to a screen in which the sheet size is able to be selected and input. After that, while seeing the selection input screen for a sheet size or the selection input screen for a sheet type, the user may select and input a desired sheet size or a desired sheet type. Note that, in a case where any of the sheet size and the sheet type of the sheet to be printed matches that of the current setting information 54, the user does not have to select and input the setting item that is matched.

In a case where the sheet setting confirmation screen 56 illustrated in FIG. 12 is displayed at step S5, the user selects and inputs the display area of the sheet type or the display area of the sheet size, or when the sheet to be printed has the same sheet type and sheet size as the sheet type and sheet size that are displayed, the user selects and inputs the display area of "OK". For example, in a case where the display area of the sheet type is selected and input in a state where the sheet setting confirmation screen 56 of FIG. 12 is displayed, the screen is switched to the setting information change screen 57 of FIG. 13, and in a case where the display area of the sheet size is selected and input, the screen is switched to the setting information change screen 57 of FIG. 14. After that, the user may select and input a desired sheet type or a desired sheet size while seeing the setting information change screen 57 of FIG. 13 or 14.

At step S10, whether or not a setting item displayed in the setting information change screen is selected and input by the user is checked.

At step S11, in a case where the setting item is selected and input, the procedure proceeds to step S12, and otherwise, the procedure proceeds to step S13.

At step S12, a content of the setting item that is selected and input is stored in the current setting information 54. For example, in a case where a different sheet size is selected and input, the sheet size of the current setting information 54 is updated to have the content that is selected and input. Then, the procedure returns to step S10.

In a case where an input meaning completion of selection of the setting item is performed at step S13, the procedure ends, and otherwise, the procedure returns to step S10. Note that, in a case where the input meaning completion of selection of the setting item is performed, the procedure may proceed to processing of starting printing after the flowchart of FIG. 4 ends, similarly to the case where the area of "OK" is selected and input as described above.

Though the flowchart of Exemplary embodiment 1 is as described above, in a case where "0" meaning that the user does not confirm the sheet setting information is set to the setting confirmation availability information 55, the processing subsequent to step S4 is not performed, and the procedure may proceed to processing of starting printing after the flowchart of FIG. 4 ends.

As described above, when the user places the sheet on the manual tray, the sheet setting information that is currently set is displayed, so that the user is able to easily confirm whether setting of the sheet that fed by himself or herself is different from or the same as the sheet setting information that is currently set, without performing a special input operation other than the operation of placing the sheet on the manual tray.

Since setting of the sheet is input by the user only when it is desired to change the sheet setting information that is currently set after the user confirms the sheet setting information, an operation burden on the user is able to be reduced and printing processing or the like is able to be inhibited from being performed with erroneous sheet setting remained.

Exemplary Embodiment 2

Figure 5:
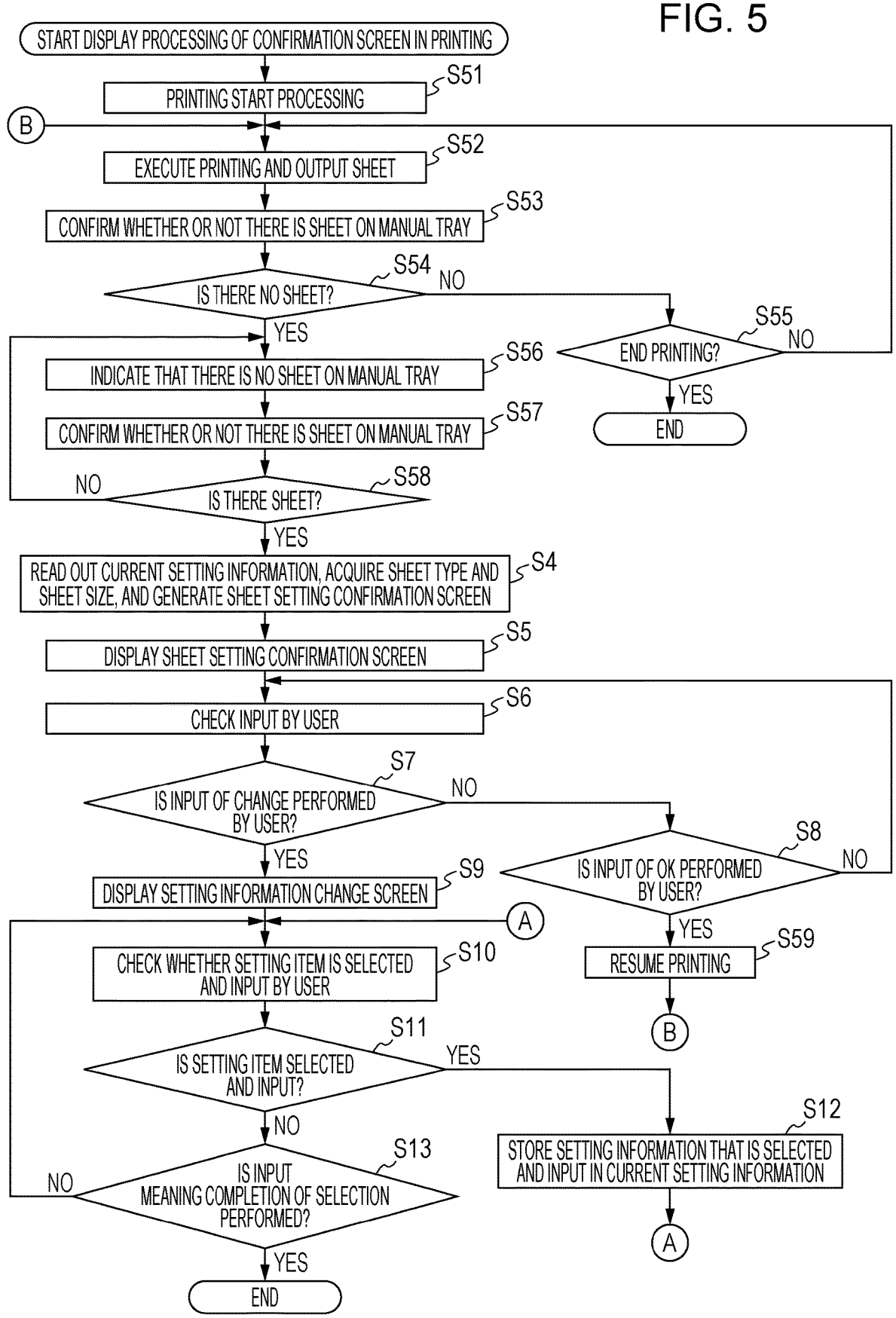
FIG. 5 is a flowchart of an exemplary embodiment of display processing or the like of the sheet setting confirmation screen in the image forming apparatus of the disclosure.

FIG. 5 illustrates a flowchart of an exemplary embodiment of display processing or the like of the sheet setting confirmation screen when no sheet placed on the manual tray is left while printing processing is executed, and a sheet is supplied to the manual tray, in the image forming apparatus of the disclosure. In the sheet setting confirmation screen 56, the sheet setting information (sheet type and sheet size) of the sheet placed on the manual tray is displayed. Here, it is assumed that printing processing has been already started by using the sheet placed on the manual tray.

Since the number of sheets that are able to be placed on toe manual tray is about ten or more in many cases, when printing is performed on a large number of sheets, there is a case where no sheet is left on the manual tray. In a case where no sheet is left on the manual tray, it is desired for the user to supply a sheet having the same size and the same type to the manual tray in order to continue printing.

In the flowchart of FIG. 5, the step at which the same processing is performed as that of the flowchart of FIG. 4 is given the same reference sign.

At step S51 of FIG. 5, it is assumed that printing start processing is performed. For example, it is assumed that after placing the sheet on the manual tray 15a, the user performs desired printing setting of the number of prints, a density, or the like, specifies the sheet on the manual tray 15a as the sheet to be printed, and performs an operation meaning start of printing.

After that, at step S52, printing processing is executed by using the sheet on the manual tray 15a and the sheet that has been printed is output to the discharge tray or the like. In a case where a plurality of sheets are printed, the sheets are sequentially taken one by one from the manual tray 15a and printing is executed until the sheets on the manual tray 15 run out.

At step S53, similarly to step S1 of FIG. 4, the control unit 11 confirms whether or not there is a sheet on the manual tray 15a of the sheet accommodating unit 15.

At step S54, in a case where it is determined that there is a sheet on the manual tray 15a, the procedure proceeds to step S55, and in a case where it is determined that there is no sheet on the manual tray 15a, the procedure proceeds to step S56.

At step S55, whether or not the printing processing ends in a state where there is a sheet is determined. For example, in a case where printing for a given number of documents to be printed ends, it is determined that the printing processing ends and the procedure ends. In a case where printing is not completed for the given number of documents to be printed, the procedure returns to step S52.

At step S56, the printing is suspended because there is no sheet on the manual tray 15a, and display is performed to indicate that there is no sheet on the manual tray 15*a* or a sheet is to be supplied to the manual tray 15*a*. By seeing such display, the user recognizes that a sheet is to be supplied to the manual tray 15*a* and supplies a sheet to the manual tray 15*a*. Here, a sheet having the same size and the same type as those of the sheet on which the printing has been performed is supplied.

At step S57, similarly to step S53, the control unit 11 confirms whether or not there is a sheet on the manual tray 15*a* of the sheet accommodating unit 15.

At step S58, in a case where it is determined that there is a sheet on the manual tray 15*a*, the procedure proceeds to step S4, and in a case where it is determined that there is no sheet on the manual tray 15*a*, the procedure returns to step S56.

After that, similarly to FIG. 4, the processing from step S4 to step S13 is executed. That is, the sheet setting confirmation screen 56 is displayed on the display unit 13, and whether "change" is input or "OK" is input after the user confirms a content thereof is checked, and when "change" is input, the setting in change screen is displayed, and the user is requested to select and input a setting item to be changed and the current setting information 54 is updated to have a content that is newly selected and input.

Note that, at step S5 of FIG. 5, in the sheet setting confirmation screen 56 displayed on the display unit 13, the current setting information 54 of the sheet that is placed on the manual tray 15*a* immediately before the printing is suspended is displayed.

In a case where no sheet is left on the manual tray 15*a* while the printing processing is executed and a sheet is supplied to the manual tray 15*a*, a sheet which has the same content as that of the sheet that is placed on the manual tray 15*a* immediately before the printing is suspended is to be supplied, it is considered that the user does not normally input "change" by confirming the sheet setting confirmation screen.

Thus, in a case where the user correctly supplies the sheet that has the same content as that of the sheet that is placed on the manual tray 15*a* immediately before the printing is suspended, the user selects and inputs "OK".

In a case where the user selects and inputs "OK", the procedure proceeds to step S59 from step S8. In this case, since the size and type of the sheet that is supplied match the content of the current setting information 54 stored in the storage unit 50, the printing processing that is suspended is resumed at step S59. Here, the printing processing is resumed by using the sheet that is newly supplied to the manual tray 15*a*. After that, the procedure returns to step S52.

Though the flowchart of Exemplary embodiment 2 is as described above, similarly to Exemplary embodiment 1, it is premised that "1" meaning that the user confirms the sheet setting information is set to the setting confirmation availability information 55.

On the other hand, in a case where "0" meaning that the user does not confirm the sheet setting information is set to the setting confirmation availability information 55, after it is confirmed that there is a sheet on the manual tray 15*a* at step S58, without performing the processing subsequent to step S4, the procedure proceeds to step S59 to resume the printing processing that is suspended. In this case, though it is premised that the user supplies a sheet that has the same content as that of the sheet placed on the manual tray 15*a* before suspending, when the user supplies the same sheet, the printing processing is able to be automatically resumed without displaying the sheet setting confirmation screen, so that the user is able to save time and effort to confirm the sheet setting information and promptly continue the printing processing.

As described above, in a case where printing processing has been already executed by using the sheet on the manual tray, also when no sheet is left on the manual tray and the user then supplies a sheet having the same content to the manual tray, the sheet setting information that is currently set is displayed on the display unit upon supply of the sheet to the manual tray, the user is able to easily confirm whether setting of the sheet that is supplied by himself or herself is different from or the same as the sheet setting information that is currently set, without performing a special input operation other than the operation of supplying the sheet to the manual tray.

Note that, in a case where, while the printing is suspended because no sheet is left, the user confirms the sheet setting confirmation screen displayed on the display unit after supplying a sheet no the manual tray and realizes that setting of the sheet that is supplied by the user is different from the sheet setting information that is currently set, the supplied sheet has different setting from that of the sheet that is placed before suspending and the erroneous sheet is supplied, so that the user is requested to supply a sheet having the same content as that of the sheet that is placed before suspending again. In this case, it is meaningful to cause the display unit to display the sheet setting confirmation screen in order to allow the user to confirm that an erroneous sheet is not supplied.

SUMMARY OF EMBODIMENTS

Embodiment 1

In a case where a user supplies a desired sheet to a sheet accommodating unit in a state where there is no sheet, a sheet setting confirmation screen that includes sheet setting information is automatically displayed on a display unit without performing an input operation with use of an operation unit by the user. Since the user does not perform the input operation with use of the operation unit, by seeing the sheet setting confirmation screen, the user is able to easily confirm whether or not information of the desired sheet that is supplied matches the sheet setting information that is displayed, so that an operation burden on the user is able to be reduced and printing processing or the like is able to be inhibited from being executed with erroneous sheet setting remained.

Embodiment 2

The sheet accommodating unit may include a manual tray and a feeding cassette, and in both cases where the sheet is supplied to the manual tray and where the sheet is supplied to the feeding cassette, the display unit may be caused to display the sheet setting confirmation screen.

Embodiment 3

Setting confirmation availability information may be stored in advance in a storage unit, and in a case where the setting confirmation availability information is set so that confirmation is allowed, the display unit may be caused to display the sheet setting confirmation screen. On the other hand, in a case where the setting confirmation availability information is set so that confirmation is not allowed, the display unit may be caused not to display the sheet setting confirmation screen. Thereby, for example, in an operation form in which the sheet placed on the manual tray is usually decided as a sheet having the same setting content and a different sheet is not used, sheet setting is not confirmed so that it is possible to promptly shift to next printing processing or the like.

Embodiment 4

Though the sheet setting information is stored in advance in the storage unit, current setting information in which setting corresponding to the sheet that is currently accommodated in the sheet accommodating unit or setting of a sheet that is used for previous printing processing or the like is stored, shipment setting information that is set and stored in advance at a time of shipment of the image forming apparatus, and user setting information that is set and stored in advance by a manager or the like of the image forming apparatus may be stored in the storage unit as the sheet setting information.

Embodiment 5

The sheet setting information may include at least a sheet type and a sheet size. A type of a sheet usable in the image forming apparatus is set as the sheet type. As the sheet size, a size of the sheet is set and a standard size or a non-standard size is set.

Embodiment 6

A content of the sheet setting information is displayed in the sheet setting confirmation screen, and current setting information in which setting corresponding to the sheet that is currently accommodated in the sheet accommodating unit or setting of a sheet that is used for previous printing processing or the like is stored may be displayed, and a sheet type and a sheet size that are included in the current setting information may be mostly displayed. Alternatively, any information of shipment setting information that is set and stored in advance at a time of shipment of the image forming apparatus and user setting information that is set and stored in advance by a manager or the like of the image forming apparatus may be displayed.

Embodiment 7

The sheet setting confirmation screen may be basically displayed so as to be overlaid on a screen that is currently displayed on the display unit. For example, the sheet setting confirmation screen is displayed as to be overlaid on a reference screen that is displayed on the display unit when a specific function is not executed.

Embodiment 8

Note that, for example, in a case where a screen that may cause a disadvantage when the sheet setting confirmation screen is displayed so as to be overlaid on the screen, such as a case where a communication information setting screen for setting information about communication is displayed, the sheet setting confirmation screen may not be displayed.

Embodiment 9

In addition to a content of the sheet setting information, a selection input area in which an input to change the sheet setting information is performed and a selection input area in which an input to indicate that confirmation of the sheet setting information is completed is performed may be displayed in the sheet setting confirmation screen.

Embodiment 10

In a case where the selection input area in which the input to change the sheet setting information is performed is input by the user with use of the operation unit, a setting information change screen may be displayed and a state where an input to change a setting item by the user is allowed may be provided. The setting information change screen may include a screen in which a sheet type is selected and input and a screen in which a sheet size is selected and input.

Embodiment 11

In a case where the selection input area in which the input to indicate that confirmation of the sheet setting information is completed is performed is input by the user, the sheet setting confirmation screen may be deleted and a state where an input to start printing processing or the like by the user is allowed may be provided.

Embodiment 12

In a case where no sheet accommodated in (placed on) the sheet accommodating unit such as the manual tray is left while the printing processing is executed and the user supplies a sheet to the sheet accommodating unit, the display unit nay be caused to display a sheet setting confirmation screen that includes the sheet setting information corresponding to the sheet that is accommodated in (placed on) the sheet accommodating unit.

In a case where the user newly supplies a sheet while the printing processing is executed, when the user confirms the sheet setting confirmation screen displayed an the display unit, the user is able to easily confirm that an erroneous sheet is not supplied.

The present disclosure contains subject matter related to that disclosed in Japanese Priority Patent Application JP 2018-000811 filed in the Japan Patent Office on Jan. 5, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image forming apparatus comprising:
   a display unit;
   a storage unit in which sheet setting information for specifying a sheet to be printed is stored in advance;
   a sheet accommodating unit in which the sheet to be printed is accommodated;
   a sheet detection unit that detects whether or not there is a sheet in the sheet accommodating unit; and
   a confirmation display control unit that causes the display unit to display a sheet setting confirmation screen that includes the sheet setting information stored in the storage unit, wherein
   in a case where the sheet detection unit detects that a sheet is supplied to the sheet accommodating unit,
   the confirmation display control unit causes the display unit to display the sheet setting confirmation screen, wherein any information of current setting information in which setting corresponding to the sheet that is currently accommodated in the sheet accommodating unit or setting of a sheet that is used for previous printing processing is stored, shipment setting information that is set and stored in advance at a time of shipment of the image forming apparatus, and user setting information that is set and stored in advance by a manager of the image forming apparatus is displayed in the sheet setting confirmation screen.

2. The image forming apparatus according to claim 1, wherein the sheet accommodating unit includes a manual tray and a feeding cassette.

3. The image forming apparatus according to claim 1, wherein
setting confirmation availability information is stored in advance in the storage unit, and
in a case where the setting confirmation availability information is set so that confirmation is allowed, the display unit is caused to display the sheet setting confirmation screen, and
in a case where the setting confirmation availability information is set so that confirmation is not allowed, the display unit is caused not to display the sheet setting confirmation screen.

4. The image forming apparatus according to claim 1, wherein any one or more pieces of information of current setting information in which setting corresponding to the sheet that is currently accommodated in the sheet accommodating unit or setting of a sheet that is used for previous printing processing is stored, shipment setting information that is set and stored in advance at a time of shipment of the image forming apparatus, and user setting information that is set and stored in advance by a manager of the image forming apparatus are stored in the storage unit as the sheet setting information.

5. The image forming apparatus according to claim 1, the sheet setting information includes a sheet type that sets a type of a sheet usable in the image forming apparatus and a sheet size that sets a size of a sheet.

6. The image forming apparatus according to claim 1, wherein the sheet setting confirmation screen is displayed so as to be overlaid on a screen that is currently displayed on the display unit.

7. The image forming apparatus according to claim 1, wherein in a case where a predetermined screen is displayed on the display unit, the sheet setting confirmation screen is not displayed.

8. An image forming apparatus comprising:
a display unit;
a storage unit in which sheet setting information for specifying a sheet to be printed is stored in advance;
a sheet accommodating unit in which the sheet to be printed is accommodated;
a sheet detection unit that detects whether or not there is a sheet in the sheet accommodating unit; and
a confirmation display control unit that causes the display unit to display a sheet setting confirmation screen that includes the sheet setting information stored in the storage unit, wherein
in a case where the sheet detection unit detects that a sheet is supplied to the sheet accommodating unit,
the confirmation display control unit causes the display unit to display the sheet setting confirmation screen,
wherein a selection input area in which an input to change sheet setting information is performed and a selection input area in which an input to indicate that confirmation of sheet setting information is completed is performed are further displayed in the sheet setting confirmation screen,
further comprising:
an operation unit; and
a setting selection input unit by which a content of the sheet setting information is selected and input, wherein
in a case where the selection input area in which the input to change the sheet setting information is performed is input by the operation unit, a setting information change screen is displayed and a state where an input to change a setting item of the sheet setting information is allowed by the setting selection input unit is provided.

9. The image forming apparatus according to claim 8, wherein the setting information change screen includes a screen in which a sheet type is selected and input and a screen in which a sheet size is selected and input.

10. The image forming apparatus according to claim 8, wherein in a case where the selection input area in which the input to indicate that confirmation of the sheet setting information is completed is performed is input by a user, the sheet setting confirmation screen is deleted and a state where an input to start printing processing by the user is allowed is provided.

11. An image forming apparatus comprising:
a display unit;
a storage unit in which sheet setting information for specifying a sheet to be printed is stored in advance;
a sheet accommodating unit in which the sheet to be printed is accommodated;
a sheet detection unit that detects whether or not there is a sheet in the sheet accommodating unit; and
a confirmation display control unit that causes the display unit to display a sheet setting confirmation screen that includes the sheet setting information stored in the storage unit, wherein
in a case where the sheet detection unit detects that a sheet is supplied to the sheet accommodating unit,
the confirmation display control unit causes the display unit to display the sheet setting confirmation screen,
wherein in a case where no sheet accommodated in the sheet accommodating unit is left while printing processing is executed and a user supplies a sheet to the sheet accommodating unit, the confirmation display control unit causes the display unit to display a sheet setting confirmation screen that includes sheet setting information corresponding to the sheet that has been accommodated in the sheet accommodating unit.

\* \* \* \* \*